US012595767B2

(12) United States Patent
Cafaro et al.

(10) Patent No.: US 12,595,767 B2
(45) Date of Patent: Apr. 7, 2026

(54) SYSTEMS AND METHODS FOR ENGINE WEAR REDUCTION

(71) Applicant: General Electric Company, Schenectady, NY (US)

(72) Inventors: Stefan Joseph Cafaro, Chapel Hill, NC (US); Sridhar Adibhatla, Cincinnati, OH (US); William Colton Caynoski, Menands, NY (US); Justin Barton, North Huntingdon, PA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 18/519,919

(22) Filed: Nov. 27, 2023

(65) Prior Publication Data

US 2025/0172096 A1      May 29, 2025

(51) Int. Cl.
*F02C 9/22*          (2006.01)
*F01D 7/00*          (2006.01)

(52) U.S. Cl.
CPC .................. *F02C 9/22* (2013.01); *F01D 7/00* (2013.01); *F05D 2260/70* (2013.01); *F05D 2270/11* (2013.01)

(58) Field of Classification Search
CPC .......... F02C 9/22; F01D 7/00; F05D 2260/70; F05D 2270/11
See application file for complete search history.

(56) References Cited

U.S. PATENT DOCUMENTS

| | | | |
|---|---|---|---|
| 8,545,178 | B2 | 10/2013 | Perkinson |
| 10,428,794 | B2 | 10/2019 | Ebbesen |
| 10,618,667 | B2 | 4/2020 | Keller |
| 11,174,839 | B2 | 11/2021 | Broderick |
| 11,427,304 | B2 | 8/2022 | Lamarre |
| 2013/0259688 | A1 | 10/2013 | Soerensen |
| 2016/0123238 | A1* | 5/2016 | Kay ........................ F01D 9/041 |
| | | | 415/118 |
| 2019/0031319 | A1 | 1/2019 | Calkins |
| 2019/0277200 | A1* | 9/2019 | Mistry ..................... F02C 9/18 |

FOREIGN PATENT DOCUMENTS

| | | |
|---|---|---|
| FR | 3127024 | 3/2023 |
| FR | 3127025 | 3/2023 |
| FR | 3127269 | 3/2023 |
| FR | 3129375 | 5/2023 |

(Continued)

*Primary Examiner* — Aaron R Eastman
(74) *Attorney, Agent, or Firm* — Smith Gambrell & Russell LLP

(57) ABSTRACT

An engine may include a processor communicatively coupled to a pitch actuator configured to affect a pitch of a plurality of variable pitch blades and a secondary thrust effector device. The processor is configured to change the pitch of the plurality of variable pitch blades via the pitch actuator in response to changes in a target engine parameter a normal operating mode, detect a trigger condition for a wear reduction mode, and switch from the normal operating mode to the wear reduction mode, wherein in the wear reduction mode, the pitch of the plurality of variable pitch blades is maintained at a first angle, and the secondary thrust effector device is controlled in response to the changes in the target engine parameter.

18 Claims, 12 Drawing Sheets

(56)        References Cited

FOREIGN PATENT DOCUMENTS

| | | |
|---|---|---|
| FR | 3129428 | 5/2023 |
| FR | 3129432 | 5/2023 |
| FR | 3129436 | 5/2023 |
| FR | 3129690 | 6/2023 |
| FR | 3129970 | 6/2023 |
| FR | 3129972 | 6/2023 |
| FR | 3130313 | 6/2023 |
| FR | 3130323 | 6/2023 |
| FR | 3130747 | 6/2023 |
| FR | 3130874 | 6/2023 |
| FR | 3130875 | 6/2023 |
| FR | 3130877 | 6/2023 |
| FR | 3130879 | 6/2023 |
| FR | 3130894 | 6/2023 |
| FR | 3130895 | 6/2023 |
| FR | 3130896 | 6/2023 |
| FR | 3130897 | 6/2023 |
| FR | 3132279 | 8/2023 |
| FR | 3132729 | 8/2023 |
| FR | 3132743 | 8/2023 |
| FR | 3133367 | 9/2023 |
| FR | 3133368 | 9/2023 |

* cited by examiner

SYSTEMS AND METHODS FOR ENGINE WEAR REDUCTION

FIELD OF THE DISCLOSURE

The present subject matter relates generally to turbine engines, and specifically to controls of a turbine engine for wear reduction.

BACKGROUND

Gas turbine systems generally include a compressor, a combustor, and a turbine. The compressor compresses air from an air intake, and subsequently directs the compressed air to the combustor. In the combustor, the compressed air received from the compressor is mixed with a fuel and is combusted to create combustion gases. The combustion gases are directed into the turbine. In the turbine, the combustion gases pass across turbine blades of the turbine, thereby driving the turbine blades, and a shaft to which the turbine blades are attached, into rotation. The rotation of the shaft may further drive a load, such as an electrical generator, that is coupled to the shaft. A turbine system can further include variable pitch blades and/or vanes that can be actuated to affect the output of the engine.

BRIEF DESCRIPTION OF THE DRAWINGS

A full and enabling description of the present disclosure, including the best mode thereof, directed to one of ordinary skill in the art, is set forth in the specification, which makes reference to the appended figures, in which.

DETAILED DESCRIPTION

Figure 1:
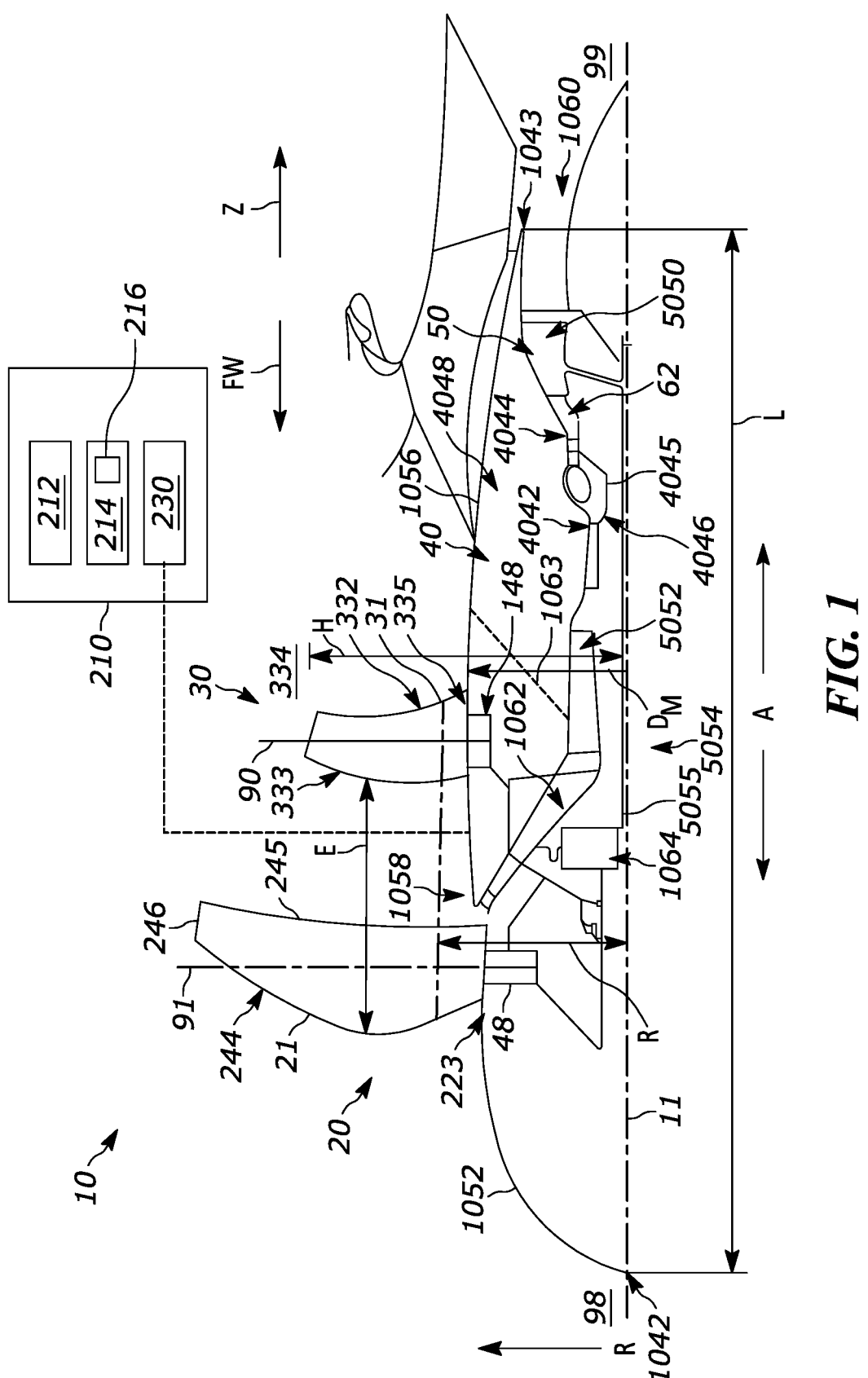
FIG. 1 is a cross-sectional side view of an embodiment of a propulsion system according to some embodiments.

Reference now will be made in detail to embodiments of the present disclosure, one or more examples of which are illustrated in the drawings. Each example is provided by way of explanation of the present disclosure, not limitation of the disclosure. In fact, it will be apparent to those skilled in the art that various modifications and variations can be made in the present disclosure without departing from the scope or spirit of the disclosure. For instance, features illustrated or described as part of one embodiment can be used with another embodiment to yield a still further embodiment.

Thus, it is intended that the present disclosure covers such modifications and variations as come within the scope of the appended claims and their equivalents.

As used herein, the terms "first," "second," "third," etc. may be used interchangeably to distinguish one component from another and are not intended to signify location or importance of the individual components.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a," "an," and "the" include plural referents unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "about," "approximately," "almost," and "substantially" are not to be limited to the precise value specified. In some instances, the approximating language may correspond to the precision of an instrument for measuring the value. For example, the approximating language may refer to being within a 1, 2, 4, 10, 15, or 20 percent margin. These approximating margins may apply to a single value, either or both endpoints defining numerical ranges, and/or the margin for ranges between endpoints. Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

In some aspects, systems and methods described herein are configured to reduce engine effector and/or actuator wear by reconfiguring the controls of the effectors in specific operating conditions to temporarily replace the primary effector-driven controls with a secondary effector when it is advantageous to do so. The controller may be configured to swap out the desired actuator-loop pairing to reduce wear and prolong the life cycle of the effector and/or actuator while preserving the desired controlled output.

In some embodiments, the systems and methods described herein can improve the tracking performance of controlled outputs under situations where it is desirable to either preserve the overall movement of the primary actuator and/or to improve tracking of the desired output in certain types of conditions, such as small signal versus large signal tracking.

In some embodiments, a processor of an engine controller is configured to switch between a normal operating mode and a wear reduction mode. In some embodiments, an algorithm is provided that detects prolonged steady-state operation (i.e., cruise, climb) and actively locks the pitch of variable blades to a fixed position. In some embodiments, a subsequent control algorithm can use available effectors (e.g., fuel, embedded electric MGs) to respond to small throttle movements (e.g., auto throttle) to regulate thrust (via fan speed, torque, or other measurable control modes). In some embodiments, the algorithm may further be configured to unlock pitch when exiting steady-state operation and/or detects large changes in throttle. In some embodiments, the processor reduces pitch oscillations during steady-state operation (e.g., ~0-1 degree at a frequency of 0-0.5 Hertz (Hz)) which can help reduce hardware cycles. In some embodiments, the processor applies adaptable small signal power management, for example, when pitch is locked, a linear fuel-to-fan speed relationship can be used for better thrust tracking but can revert back to a preferred relationship (e.g., exponential) for nominal power management. In some embodiments, for Multi Input Multi Output (MIMO) configurations, managing speed and torque, and locking of pitch result in reduced order of 1×1 control or 2×2, which can be preserved by substituting in alternative effectors, such as hybrid motor generators. In some embodiments, in the wear reduction mode, the processor can use adaptable gains to increase the bandwidth of active thrust control loops and decrease the bandwidth of the desired reduced wear actuation loop to limit pitch change rate.

In some embodiments, an algorithm may detect favorable operating conditions for actuator-output control reconfiguration. The switch to a wear reduction mode may be triggered by one or more of the detection of small signal changes, steady state operation, electric power availability, and/or environment changes (e.g., rain, icing, etc.). In some embodiments, an algorithm may reconfigure a stable closed-loop control by swapping effector(s) with the primary effector, adapting gain schedules accordingly, and using either hardware or software means to lock the swapped effector. For example, the controller may replace fuel control of fan speed with electric power control of fan speed for small signal control. In another example, the controller locks the pitch on a variable pitch application and control torque with an alternative effector. In some embodiments, the algorithm is configured to revert the control reconfiguration when conditions require the use of the primary effect to preserve normal control response. For example, a large throttle signal can cause fan speed control to revert back to fuel flow.

In some embodiments, the controller is configured to reduce pitch oscillations during steady-state operation (e.g., ~0-1 degree at a frequency of 0-0.5 Hz), which can help reduce hardware cycles on a variable pitch gas turbine application. In some embodiments, the controller is configured for adaptable control gain management, such that swapping effectors with different plant models and gains can be smoothly transitioned. In some embodiments, primary effectors may include one or more of fuel, pitch, variable stator vanes, inlet guide vanes, outlet guide vanes, or variable nozzle. In some embodiments, an alternative/secondary effector may include one or more of motor generators, inlet guide vanes, outlet guide vanes, and/or bleed valves. In some embodiments, the systems and methods described herein are configured to operate in a wear reduction mode that reduces the wear of one or more primary effectors. In some embodiments, during the wear reduction mode, an alternative or secondary effector is used to replace the effects of the primary effector. In some embodiments, in the wear reduction mode, the target engine output may be preserved through the use of the secondary effector. In some embodiments, the outputs may include one or more of thrust, speed, torque, power, pressure, and/or pressure ratio. In some embodiments, the processor may be configured to trigger the wear reduction mode based on detecting steady state operation, power availability, mission profile (e.g., descent), and environmental conditions (e.g., rain, icing). In some embodiments, the trigger condition for wear reduction mode may be detected based on sensors for throttle, torque, speed, and/or use request.

Referring now to the drawings, wherein identical numerals indicate the same elements throughout the figures, certain embodiments will be described. Referring to FIG. 1, in general, embodiments of an engine 10 variously depicted and described herein include a computing system 210 configured to include one or more controllers, and/or configured to execute steps of a method or other operations provided herein. For instance, FIG. 1 illustrates one embodiment of suitable components that can be included within the computing system 210. As shown in FIG. 1, the computing system 210 can include a processor 212 and associated memory 214 configured to perform a variety of computer-implemented functions (e.g., performing the methods, steps, calculations and the like disclosed herein).

As shown, the computing system 210 can include control logic 216 stored in memory 214. The control logic 216 may include instructions that, when executed by the one or more processors 212, cause the one or more processors 212 to perform operations, such as the method or operations described herein. Additionally, as shown in FIG. 1, the computing system 210 can also include a communications interface module 230. In several embodiments, the communications interface module 230 can include associated electronic circuitry that is used to send and receive data. As such, the communications interface module 230 of the computing system 210 can be used to send and/or receive data to/from the engine 10 and any other suitable components of the engine 10, including any number of motors, actuators, fuel lines, linkages, vane or blade pitch change mechanisms, sensors, or other actuatable structures, such as one or more of such components as depicted and described herein.

It should be appreciated that the communications interface module 230 can be any combination of suitable wired and/or wireless communications interfaces and, thus, can be communicatively coupled to one or more components of the engine 10 via a wired and/or wireless connection. As such, the computing system 210 may obtain, determine, store, generate, transmit, or operate any one or more steps of the operations such as described herein with regard to the engine 10 or an apparatus (e.g., aircraft or other vehicle) to which the engine 10 is attached.

Further, certain embodiments of the unducted single rotor turbomachine engine described hereinbelow may include an electric machine. An electric machine may generally include a stator and a rotor, the rotor rotatable relative to the stator. Additionally, the electric machine may be configured to convert mechanical power to electrical power, or electrical power to mechanical power. For example, the electric machine may be configured as an asynchronous or induction electric machine operable to generate or utilize alternating current (AC) electric power. Alternatively, the electric machine may be configured as a synchronous electric machine operable to generate or utilize AC electric power or direct current (DC) electric power. In such a manner, it will be appreciated that the stator, the rotor, or both may generally include one or more of a plurality of coils or winding arranged in any suitable number of phases, one or more permanent magnets, one or more electromagnets, etc.

FIG. 1 illustrates a single unducted rotor engine 10 according to some embodiments. Embodiments of the engine, propulsion system, or thrust-producing system provided herein may generate an increased unducted rotor efficiency at, and above a threshold power loading (i.e., power/area of rotor airfoil). In certain embodiments, the threshold power loading is 25 horsepower per feet squared (ft2) or greater at cruise altitude. In particular embodiments of the engine, structures and methods provided herein generate power loading between 25 horsepower/ft2 and 100 horsepower/ft2 at cruise altitude. Cruise altitude is generally an altitude at which an aircraft levels after climb and prior to descending to an approach flight phase. In various embodiments, the engine is applied to a vehicle with a cruise altitude up to approximately 65,000 ft. In certain embodiments, cruise altitude is between approximately 28,000 ft and approximately 45,000 ft. In still other embodiments, cruise altitude is expressed in flight levels based on a standard air pressure at sea level, in which a cruise flight condition is between FL280 and FL650. In another embodiment, cruise flight condition is between FL280 and FL450. In yet other embodiments, cruise altitude is defined based at least on a barometric pressure, in which cruise altitude is between approximately 4.85 pounds per square inch absolute (psia) and approximately 0.82 psia based on a sea level pressure of approximately 14.70 psia and a sea level temperature at approximately 59 degrees Fahrenheit. In another embodiment, cruise altitude is between approximately 4.85 psia and approximately 2.14 psia. It should be appreciated that in certain embodiments, the ranges of cruise altitude defined by pressure may be adjusted based on a different reference sea level pressure and/or sea level temperature.

FIG. 1 shows an elevational cross-sectional view of an exemplary embodiment of a single unducted rotor engine 10. As is seen from FIG. 1, the engine 10 takes the form of an open rotor propulsion system and has a rotor assembly 20 which includes an array of airfoil blades 21 around a longitudinal axis 11 of engine 10. Blades 21 are arranged in typically equally spaced relation around the longitudinal axis 11, and each blade 21 has a root 223 and a tip 246 and a span defined therebetween.

Additionally, engine 10 includes a gas turbine engine having a core (or high speed system) 40 and a low speed system. The core engine 40 generally includes a high speed compressor 4042, a high speed turbine 4044, and a high speed shaft 4045 extending therebetween and connecting the high speed compressor 4042 and high speed turbine 4044. The high speed compressor 4042, the high speed turbine 4044, and the high speed shaft 4045 may collectively define and be referred to as a high speed spool 4046 of the engine. Further, a combustion section 4048 is located between the high speed compressor 4042 and high speed turbine 4044. The combustion section 4048 may include one or more configurations for receiving a mixture of fuel and air and providing a flow of combustion gasses through the high speed turbine for driving the high speed spool 4046.

The low speed system 50 similarly includes a low speed turbine 5050, a low speed compressor 5052, and a low speed shaft 5055 extending between and connecting the low speed compressor 5052 and low speed turbine 5050. The low speed compressor 5052, the low speed turbine 5050, and the low speed shaft 5055 may collectively define and be referred to as a low speed spool 5054 of the engine.

In various embodiments, the core engine 40 may include a third-stream flowpath 1063, such as to bypass flow from a core flowpath downstream of one or more compressors. The third-stream flowpath 1063 may generally define a concentric or non-concentric flowpath relative to the flowpath 1062 downstream of one or more compressors or fan stages. The third-stream flowpath 1063 is configured to selectively remove a portion of flow from the core flowpath 1062, such as via one or more variable guide vanes, nozzles, or other actuatable flow control structures. The third-stream flowpath 1063 may bypass the combustion section 4048. In certain embodiments, the third-stream flowpath 1063 furthermore bypasses all or part of the flowpath at the turbine section.

It should be appreciated that the terms "low" and "high", or their respective comparative degrees (e.g., -er, where applicable), when used with compressor, turbine, shaft, or spool components, each refer to relative speeds within an engine unless otherwise specified. For example, a "low turbine" or "low speed turbine" defines a component configured to operate at a rotational speed, such as a maximum allowable rotational speed, lower than a "high turbine" or "high speed turbine" at the engine. Alternatively, unless otherwise specified, the aforementioned terms may be understood in their superlative degree. For example, a "low turbine" or "low speed turbine" may refer to the lowest maximum rotational speed turbine within a turbine section, a "low compressor" or "low speed compressor" may refer to the lowest maximum rotational speed turbine within a compressor section, a "high turbine" or "high speed turbine" may refer to the highest maximum rotational speed turbine within the turbine section, and a "high compressor" or "high speed compressor" may refer to the highest maximum rotational speed compressor within the compressor section. Similarly, the low speed spool refers to a lower maximum rotational speed than the high speed spool. It should further be appreciated that the terms "low" or "high" in such aforementioned regards may additionally, or alternatively, be understood as relative to minimum allowable speeds, or minimum or maximum allowable speeds relative to normal, desired, steady state, etc. operation of the engine.

Although the engine 10 is depicted with the low speed compressor 5052 positioned forward (i.e., proximate to a forward end 98) of the high speed compressor 4042, in certain embodiments the compressors 4042, 5052 may be in interdigitated arrangement, i.e., rotary airfoils of the low speed compressor 5052 are in alternating arrangement along the gas flowpath with rotary airfoils of the high speed compressor 4042. Additionally, or alternatively, although the engine 10 is depicted with the high speed turbine 4044 positioned forward of the low speed turbine 5050, in certain embodiments the turbines 4044, 5050 may be in interdigitated arrangement.

In FIG. 1, the core engine 40 is generally encased in a cowl 1056 defining a maximum diameter DM. The vane assembly 30 is extended from the cowl 1056 and positioned aft of the rotor assembly 20. In various embodiments, the maximum diameter is defined as a flowpath surface facing outward along the radial direction R in fluid communication with the flow of fluid egressed from the rotor assembly 20. In certain embodiments, the maximum diameter of the cowl 1056 corresponds substantially to a location or positioning of a root 335 of a vane 31 of the vane assembly 30 extended from the cowl 1056. The rotor assembly 20 further includes a hub 1052 extended forward of the plurality of blades 21. In certain embodiments, the engine 10 defines a length L from a forward end 1042 of the hub 1052 to an aft end 1043 of the cowl 1056.

Moreover, it will be appreciated that the engine 10 further includes a cowl 1056 surrounding the turbomachinery and defining at least in part an inlet 1058, an exhaust 1060, and the turbomachinery flowpath 1062 extending between the inlet 1058 and the exhaust 1060. The inlet 1058 is for the embodiment shown an annular or axisymmetric 360 degree inlet 1058 located between the rotor assembly 20 and the vane assembly 30, and provides a path for incoming atmospheric air to enter the turbomachinery flowpath 1062 (and compressors, combustion section, and turbines) radially inwardly of the vane assembly 30. Such a location may be advantageous for a variety of reasons, including management of icing performance as well as protecting the inlet 1058 from various objects and materials as may be encountered in operation.

As is depicted, the rotor assembly 20 is driven by the turbomachinery, and more specifically, is driven by the low speed spool 5054. More specifically, still, engine 10 in the embodiment shown in FIG. 1 includes a power gearbox 1064, and the rotor assembly 20 is driven by the low speed spool 5054 of the turbomachinery across the power gearbox 1064. In such a manner, the rotating blades 21 of the rotor assembly 20 may rotate around the axis 11 and generate thrust to propel the engine 10, and hence an aircraft to which it is associated, in a forward direction FW.

The power gearbox 1064 may include a gearset for decreasing a rotational speed of the low speed spool 5054 relative to the low speed turbine 5050, such that the rotor assembly 20 may rotate at a slower rotational speed than the low speed spool 5054. In certain embodiments, the power gearbox 1064 includes a gear ratio of at least 4:1. Although in various embodiments the 4:1 gear ratio may generally provide for the low speed turbine 5050 to rotate at approximately four times the rotational speed of the rotor assembly 20, it should be appreciated that other structures provided herein, such as the blade pitch change mechanism and/or an electric machine, may allow the unducted rotor assembly 20 to operate substantially de-coupled from the low speed turbine 5050 rotational speed. Moreover, when using an interdigitated counter-rotating or vaneless turbine the gear ratio may be reduced without an appreciable loss in output power from the rotor assembly 20.

Single unducted rotor engine 10 also includes in the exemplary embodiment a vane assembly 30 which includes an array of vanes 31 also disposed around longitudinal axis 11, and each vane 31 has a root 335 and a tip 334 and a span defined therebetween. These vanes 31 are mounted to a stationary frame and do not rotate relative to the longitudinal axis 11. In certain embodiments, the vanes 31 include a mechanism for adjusting their orientation relative to their axis 90 and/or relative to the blades 21, such as further described herein. For reference purposes, FIG. 1 also depicts a forward direction denoted with arrow FW, which in turn defines the forward and aft portions of the system. As shown in FIG. 1, the rotor assembly 20 is located forward of the turbomachinery in a "puller" configuration, and the exhaust 1060 is located aft of the vane assembly 30.

Various embodiments of the single unducted rotor engine include a vane assembly 30 in aerodynamic relationship with a bladed rotor assembly 20. In FIG. 1, the vane assembly 30 is positioned aft (i.e., proximate to aft end 99) or generally downstream (relative to normal forward operation, schematically depicted by arrow FW) of a single unducted rotor assembly 20. The vane assembly 30 includes a leading edge 333 and a trailing edge 332. The vane assembly 30 may generally define a de-swirler device configured to reduce or convert kinetic energy losses from unducted rotors into thrust output. In certain embodiments, the vane assembly 30 is configured to adjust vane pitch angle around an axis 90 based at least on output velocity vectors from the rotor assembly 20. The adjustable vane pitch angle is configured to output a desired thrust vector based on a desired engine operation (e.g., forward thrust, neutral or no thrust, or reverse thrust) and desired acoustic noise level. In still certain embodiments, the bladed rotor assembly 20 is configured to adjust blade pitch angle around an axis 91 based at least on a desired output velocity vector to the vane assembly 30, a desired engine operation, or a desired acoustic noise level. In still various embodiments, the rotor assembly 20 is configured to adjust rotor plane based on an angle of attack of incoming air to the rotor assembly, such as to adjust an output velocity vector to the vane assembly and reduce or eliminate undesired noise levels from the rotor assembly.

Certain embodiments of the single unducted rotor engine 10 provide noise reduction or attenuation based on dynamic blade pitch angle changes, vane pitch angle changes, and/or rotor plane angle changes relative to angle of attack of incoming air and output air velocity from the rotor assembly to an aft vane assembly. Additionally, or alternatively, embodiments of the engine 10 provided herein may attenuate low frequency noise, such as those that may propagate to the ground while an engine is at cruise altitude, or as may be referred to as "en-route noise." Various embodiments of the engine are configured to desirably alter rotor plane angle, blade pitch angle, and/or vane pitch angle to mitigate the propagation of undesired noise to the ground and the fuselage. Additionally, the engine 10 may be configured to desirably deflect noise upward (e.g., skyward) rather than toward the ground. As such, perceived noise levels may be reduced or mitigated by one or more structures provided herein.

It may be desirable that the blades 21, the vanes 31, or both, incorporate a pitch change mechanism such that the airfoils (e.g., blades 21, vanes 31, etc.) can be rotated with respect to an axis of pitch rotation either independently or in conjunction with one another. Such pitch change can be utilized to vary thrust and/or swirl effects under various operating conditions, including to adjust a magnitude or direction of thrust produced at the vanes 31, or to provide a thrust reversing feature which may be useful in certain operating conditions such as upon landing an aircraft, or to desirably adjust acoustic noise produced at least in part by the blades 21, the vanes 31, or aerodynamic interactions from the blades 21 relative to the vanes 31.

Vanes 31 are sized, shaped, and configured to impart a counteracting swirl to the fluid so that in a downstream direction aft of both rows of airfoils (e.g., blades 21, vanes 31) the fluid has a greatly reduced degree of swirl, which translates to an increased level of induced efficiency. Embodiments of the blade 21 may include geometries or features providing loading distribution such as provided in U.S. Pat. No. 10,202,865 B2 "Unducted Thrust Producing System", and herein incorporated by reference in its entirety for all purposes. In particular embodiments, the blades 21 include a sheet metal sheath at the leading edge. In various embodiments, the blades 21 include one or more features, including orifices, voids, openings, cavities, or other frangible features configured to desirably liberate portions of the blade 21, such as to minimize damage to the fuselage of an aircraft.

It should be appreciated that various embodiments of the single unducted rotor engine 10 depicted and described herein may allow for normal subsonic aircraft cruise altitude operation at or above Mach 0.5. In certain embodiments, the engine 10 allows for normal aircraft operation between Mach 0.55 and Mach 0.85 at cruise altitude. In some such embodiments, the engine 10 allows for normal aircraft operation between Mach 0.75 and Mach 0.85. In certain embodiments, the engine 10 allows for rotor blade tip speeds at or less than 750 feet per second (fps).

Figure 2:
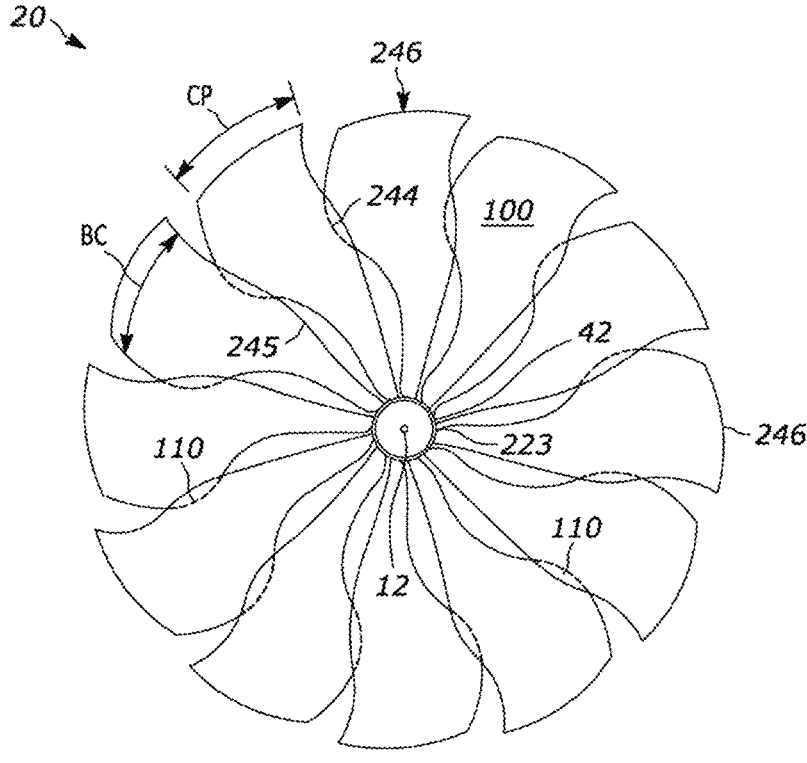
FIG. 2 is a flowpath view of an exemplary embodiment of a rotor assembly of the propulsion system of FIG. 1.
Figure 3:
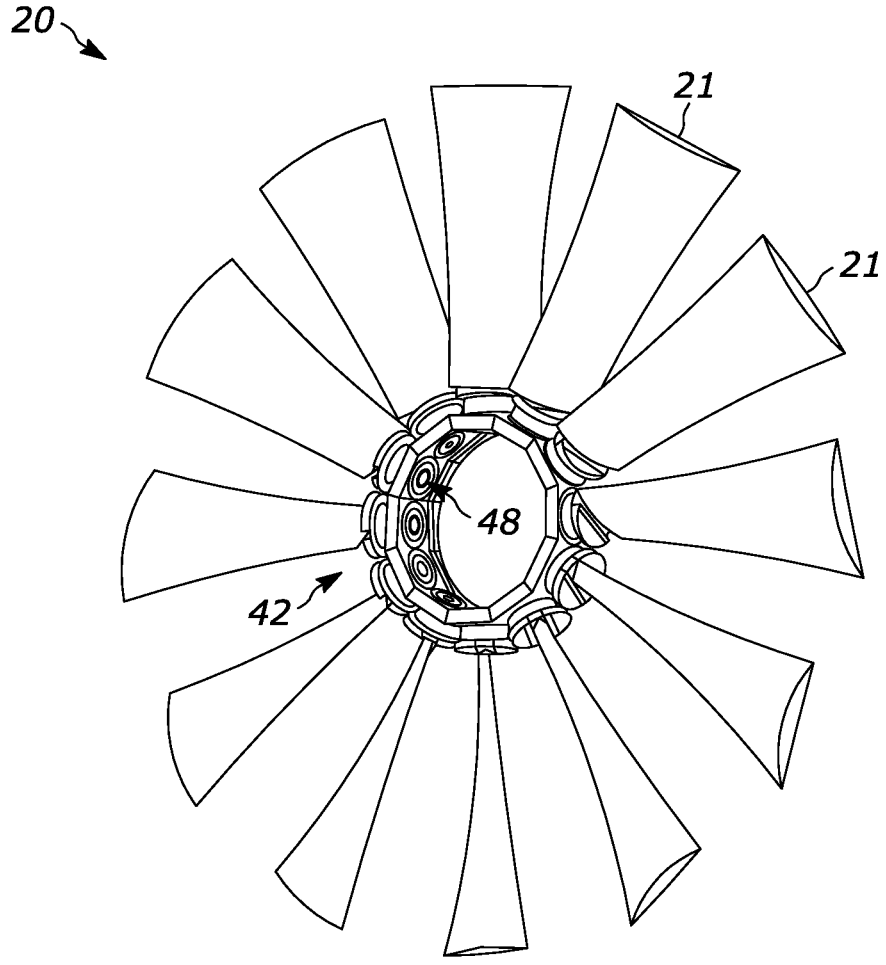
FIG. 3 is a perspective view of an exemplary embodiment of the rotor assembly of FIG. 2.

Referring now to FIGS. 2-3, in certain embodiments, the rotor assembly 20 includes a variable pitch rotor blade assembly 20 having a plurality of rotor blades 21 spaced apart and coupled to a disk 42. As depicted in the examples of FIGS. 2 and 3, the blades 21 extend outwardly from disk 42 generally along a radial direction R. Each of the plurality of blades 21 defines a leading edge 244 and a tip 246 defined at a radially outer edge of each respective rotor blade 21. Each rotor blade 21 is also rotatable relative to the disk 42 about a pitch axis P by virtue of the blades 21 being operatively coupled to a suitable actuator 48 configured to vary the pitch of the blades 21 as described in more detail below. The blades 21, disk 42, and actuator 48 are together rotatable about a rotor assembly longitudinal axis 12. It should be appreciated that longitudinal axis 12 may be co-axial or common to the central longitudinal axis 11 of the engine 10 depicted in FIG. 1. However, in other embodiments, the rotor assembly longitudinal axis 12 may be offset from the engine longitudinal axis 11, such that the engine longitudinal axis 11 and the rotor assembly longitudinal axis 12 are at an acute angle relative to one another. Additionally, in certain embodiments, the disk 42 of the variable pitch rotor assembly 20 is covered by rotatable front hub 1052 aerodynamically contoured to promote an airflow through the plurality of blades 21.

FIG. 2 provides a forward-facing-aft elevational view of the rotor assembly 20 of the exemplary engine 10 of FIG. 1. For the exemplary embodiment depicted, the rotor assembly 20 includes twelve blades 21. From a loading standpoint, such a blade count allows the span of each blade 21 to be reduced such that the overall diameter of rotor assembly 20 is also able to be reduced (e.g., to about twelve feet in the exemplary embodiment). That said, in other embodiments, rotor assembly 20 may have any suitable blade count (e.g., 3, 5, 6, 7, etc.) and any suitable diameter (e.g., 8-15 feet, etc.), such as described herein.

Each blade 21 may have a suitable aerodynamic profile including a generally concave pressure side and a circumferentially opposite, generally convex suction side 100. Each blade 21 extends from an inner end of the root 223, which is rotatably coupled to disk 42, to a radially outer distal tip 246. As shown, each blade 21 defines a chord length C that extends between opposite leading edge 244 and trailing edge 245, with the chord varying in length over the span of the blade 21. In some embodiments, the blades 21 overlap at least in region 110 if they pass through flat pitch at the same time.

In FIGS. 2-3, a pitch actuator 48 in accordance with an exemplary embodiment of the present disclosure is depicted. As mentioned above, each blade 21 is rotatable relative to the disk 42 about a pitch axis P. The blades 21, disk 42, and actuator 48 are together rotatable about the longitudinal axis 12. In certain embodiments, the pitch actuator described in regard to the blade pitch actuator 48 is further included at one or more of the vanes 31 of the vane assembly 30 as a vane pitch actuator 148. As such, at least a portion of the pitch actuator shown and described in regard to FIGS. 2-3 may be applied to one or more of the vanes 31 such as to collectively or independently adjust the orientation of the vane 31 about the axis 90 of each respective vane 31. Such independent or collective adjustment of pitch angle of the vane 31 about axis 90 may be utilized according to one or more methods further described herein, such as one or more methods for attenuating undesired acoustic noise, for producing a desired thrust vector, and/or for producing a desired thrust load.

While a single unducted rotor engine is described with reference to FIGS. 1-3, the systems and methods described herein may also be used with other types of engines such as multi-rotor unducted engines, ducted engines, low-bypass turbofan engines, high bypass turbofan engines, gas turbine engines, turboprop engines, etc. Additionally, while aircraft engines are generally described herein, systems and methods described may also be used in engines for other applications such as land vehicles, watercraft, and industrial applications.

Figure 4:
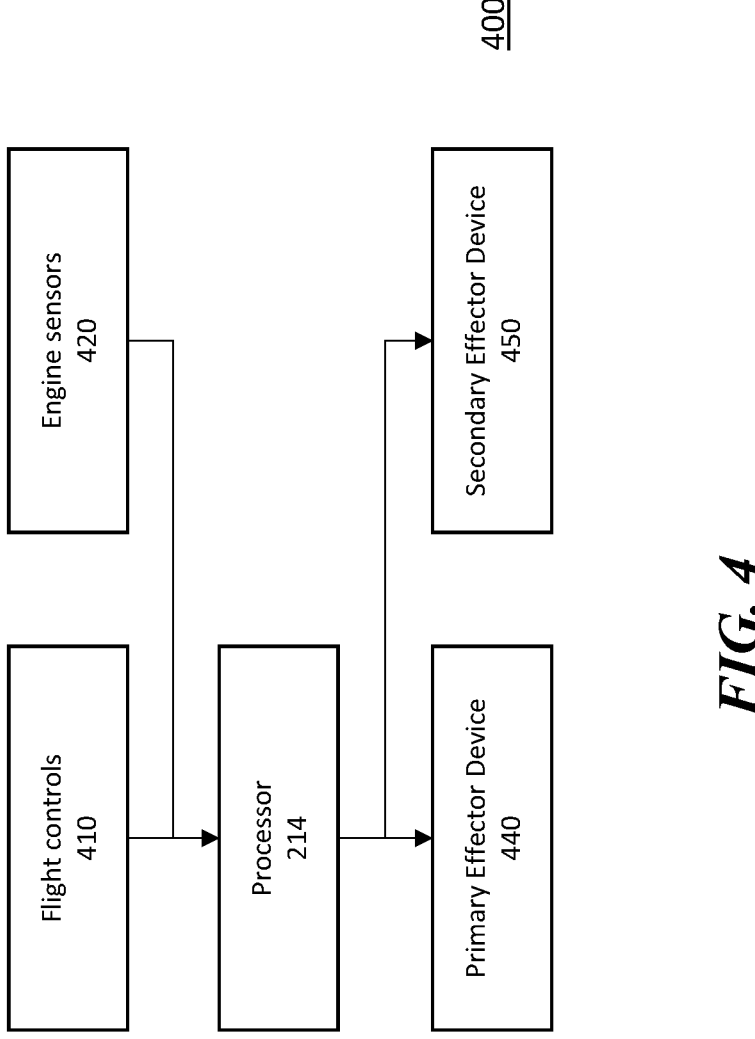
FIG. 4 is a simplified block diagram of an engine control system according to some embodiments.

Next referring to FIG. 4, a block diagram of an engine system 400 is shown. The engine system 400 includes a processor 212 configured to receive input from flight controls 410 and engine sensors 420 and control one or more primary effector devices 440 and one or more secondary effector devices 450. In some embodiments, the processor 212 may be part of a processor-based control system of an engine such as the computing system 210 of the engine 10. Operations of the processor 212 are described in more detail with reference to FIGS. 5-9, 10A, and 10B herein.

In some embodiments, the flight controls 410 may be an autothrottle system, and/or other pilot-operated inputs. In some embodiments, an autothrottle system and/or pilot user interface device may set and change the target engine parameter during various phases of flight. In some embodiments, the target engine parameter includes target thrust output, speed, torque, power pressure, and/or pressure ratio. In some embodiments, the target engine parameter may be referred to as throttle. In some embodiments, the engine sensors may include one or more sensors for measuring environmental, flight, and/or engine conditions. In some embodiments, the engine sensors 420 may include one or more of a speed sensor, an altitude sensor, a temperature sensor, a pressure sensor, a torque sensor, a thrust sensor, a Mach number sensor, etc.

The primary effector device 440 and the secondary effector device 450 may include one or more engine components configured to affect engine output based on the target engine parameter. Generally, the primary effector device 440 may be a component that is capable of causing a greater, faster, and/or more efficient effect on the engine output as compared to the secondary effector device 450. For example, in some embodiments, the primary effector device 440 may be a variable blade pitch actuator and the secondary effector device 450 may be an electric motor generator, with the pitch actuator being capable of causing a greater change in engine trust output as compared to the electric motor generator. In some embodiments, the primary effector device 440 may include one or more of a plurality of variable pitch blades, a fuel injector, a plurality of variable stator vanes, a plurality of inset guide vanes, a plurality of outlet guide vanes, or a variable nozzle. In some embodiments, the secondary effector device 450 may include one or more of a motor generator, a plurality of inlet guide vanes, a plurality of outlet guide vanes, or a plurality of bleed valves. In some embodiments, the processor 212 is further configured to control other engine components aside from the primary effector device 440 and the one or more secondary effector devices 450 described herein.

Figure 5:
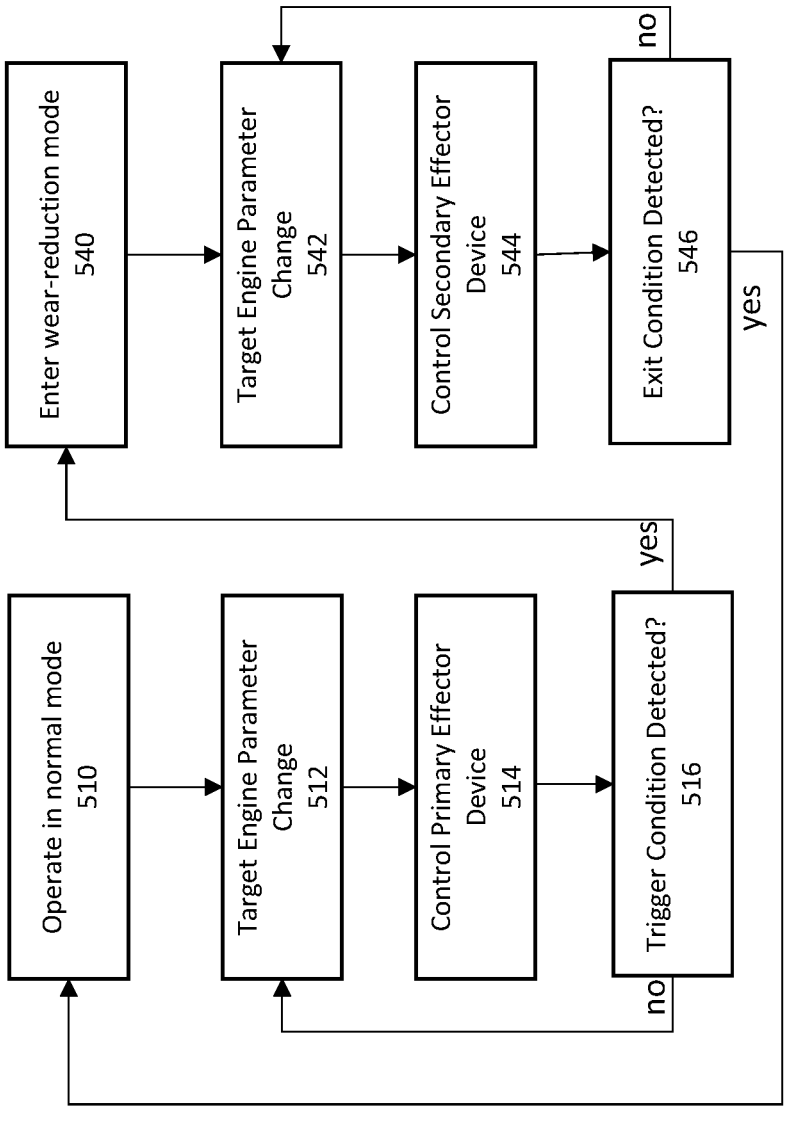
FIG. 5 is a flow diagram of a method for wear reduction according to some embodiments.

Next referring to FIG. 5, a method for controlling an engine for wear reduction is shown. In some embodiments, one or more steps of FIG. 5 may be performed with a processor-based control system of an engine such as the computing system 210 of the engine 10 and/or the processor 212 of the engine system 400.

In step 510, the engine is operated in a normal operating mode. As used herein, normal operating mode generally refers to a mode where a primary effector device 440 is controlled to respond to changes in target engine parameters in a close control loop. In some embodiments, the normal operating mode corresponds to a conventional engine control scheme where the operating parameters of the primary effector device 440 is changed immediately (e.g., within 0.5 seconds, 1 second, 2 seconds, etc.) in response to changes in target engine parameter.

In some embodiments, the primary effector device 440 includes a pitch actuator configured to affect the pitches of a plurality of variable pitch blades of an engine, such as the pitch actuator 48 described with reference to FIGS. 1-3. In some embodiments, the primary effector device 440 includes a fuel injector, a plurality of variable stator vanes, a plurality of inset guide vanes, a plurality of outlet guide vanes, or a variable nozzle such as those described with reference to FIGS. 1-3 herein.

In step 512, the target engine parameter of the engine changes. In some embodiments, the target engine parameter is determined based on flight controls 410 and engine sensors 420. In some embodiments, the target engine parameter may be received from an autothrottle system and/or determined based on a pilot throttle control. In some embodiments, the target engine parameter may be determined based on achieving a target speed, trust, torque, power pressure, and/or pressure ratio based on flight conditions measured by a sensor system.

In step 514, the primary effector device 440 is controlled in response to the target engine parameter change to allow the engine system 400 to generate the target output. For example, the processor 212 may change the fuel injection rate, the variable blade/vane pitch angle, and/or nozzle rate or angle. In some embodiments, in normal operating mode, the operating parameters of the primary effector device 440 may change within 0.5 second, 1 second, or 2 seconds of the target engine parameter changes. For example, the computing system 210 may adjust the angle of the variable blades continuously in response to changes to throttle changes. In some embodiments, the primary effector device 440 is controlled via a closed control loop at a relatively high bandwidth. In some embodiments, in step 514 a secondary effector device 450 may also be controlled in response to the target engine parameter changes.

While in the normal operating mode, the processor 212 detects for a trigger condition for a wear reduction mode in step 516. In some embodiments, the trigger condition may be detected based on signals from flight controls 410 and/or the engine sensors 420. In some embodiments, the trigger condition includes the target engine parameter being within a predetermined range over a period of time. In some embodiments, the predetermined range corresponds to a 2%, 5%, 7%, or 10% change in the target engine parameter. In some embodiments, the period of time corresponds to at least 1 minute, 2 minutes, 3 minutes or 5 minutes. In some embodiments, the trigger condition includes a threshold altitude, a threshold Mach number, and/or a throttle position to detecting a steady-state operation. In some embodiments, the trigger condition may be detected based on a flight phase indicator of the aircraft, for example, when the flight phase indicator indicates climb, cruise, or descent conditions. If the trigger condition is not detected, the engine continues to operate in the normal operating mode in step 510. If trigger condition is detected, the engine switches over to a wear reduction mode in step 540.

In some embodiments, in a wear reduction mode, operating parameters of the primary effector device 440 may be "locked" or change-rate limited. In some embodiments, the operating parameters of the primary effector (e.g., pitch angle, fuel injection rate, etc.) may be maintained at a set value for an extended period of time, such as 5 minutes, 10 minutes, or 15 minutes, etc., until an exit condition is detected. In some embodiments, the change rate of the primary effector device may be capped at 1% per second, 1% per 5 seconds, 1% per 10 seconds, etc.

In some embodiments, the primary effector device 440 includes a pitch actuator such as the actuator 4. In the wear reduction mode, the pitches of the plurality of variable pitch blades may be maintained at a fixed angle. In some embodiments, the actuator 48 includes a mechanical pitch-locking mechanism, and the mechanical pitch-locking mechanism is engaged to limit the pitching of the plurality of variable pitch blades in the wear reduction mode. In some embodiments, the pitch of the plurality of variable pitch blades is maintained at a first angle based on software control signals sent from the processor to the pitch actuator. In some embodiments, the pitch of the plurality of variable pitch blades is maintained at the first angle for at least five minutes, at least ten minutes, or at least twenty minutes In step 542, the target engine parameter changes. In some embodiments, the target engine parameter is determined based on flight controls 410 and/or engine sensors 420. In some embodiments, the target engine parameter may be received from an auto-throttle system and/or determined based on a pilot throttle control. In some embodiments, the target engine parameter is determined based on flight conditions measured by a sensor system and a target speed, trust, torque, power pressure, and/or pressure ratio.

In step 544, the one or more secondary effector devices 450 is controlled to respond to the changes in the target engine parameter. In some embodiments, the primary effector device 440 is locked during step 544 and the operating parameters of the primary effector device 440 do not change. In some embodiments, in response to the same amount of change in the target engine parameter, the secondary effector device 450 is controlled to cause a greater effect on an output parameter of the engine in the wear reduction mode as compared to the normal operating mode. In some embodiments, the secondary effector device is controlled to compensate for the effect of the primary effector device on the target engine parameter. In some embodiments, an electric motor generator functions as the secondary effector device 450 and is controlled to compensate for the effect of the pitch actuator on the target engine parameter in wear reduction mode.

In some embodiments, the change rate of the primary effector device 440 may be rate-limited, and the secondary effector device 450 is controlled to respond to the high-frequency changes in the target engine parameter while the primary effector device 440 is controlled at a low bandwidth to reduce the wear caused by the high frequency changes. For example, the processor 212 may limit the movement speed and/or amount of angle change of a variable pitch actuator while in the wear reduction mode. In some embodiments, in the normal, the pitch angle changes may be around or up to 20 degrees/second and the control bandwidth may be at around 1-5 radian/second. In some embodiment, in the wear reduction mode, the pitch angle changes may be limited to 0.01-0.1 degrees per second, and control bandwidth may be reduced to 0.1 to 1.0 rad/s.

In some embodiments, an engine 10 may operate with two or more types of wear reduction mode. For example, during climb, the primary effector device 440 may be controlled with a change-rate limit and/or with a reduced bandwidth while during cruise, the primary effector device 440 may be maintained at a fixed operating parameter.

In some embodiments, while in the wear reduction mode, the processor 212 is configured to determine target pitch angles for the plurality of variable pitch blades based on flight conditions and the target engine parameter, switch from the wear reduction mode to an adjustment mode in the event that an average target pitch angle in a time window deviates from the first angle for more than a threshold amount, and change, in the adjustment mode, the angles of the plurality of variable pitch blades from the first angle to the average target pitch angle, and in response to the variable pitch blades being pitched to the average target pitch angle, switch to the wear reduction mode.

In step 546, the processor 212 detects for wear reduction mode exit condition. In some embodiments, the exit condition includes a change of the target engine parameter exceeding an exit threshold. In some embodiments, the processor 212 determines an engine parameter baseline based on values of the target engine parameter over a period of time, wherein the exit condition is detected based on the change from the engine parameter baseline exceeding an exit threshold. For example, the processor 212 may record the target engine parameter at the time the engine system 400 switches into wear reduction mode, and exit the wear reduction mode when the target engine parameter increases or decreases by more than 2%, 3%. 5%, or 7%, etc. In some embodiments, in the wear reduction mode, the processor 212 may continue to calculate the operating parameter of the primary effector device 440 as would be in a normal operating mode. Exit condition may be detected when the calculated operating parameter of the primary effector device 440 deviates from the current operating parameter by a set threshold (e.g., 2%, 3%, 5%, etc.). For example, the processor 212 may continue to calculate a pitch angle for the pitch actuator while the pitch actuator is locked during a wear reduction mode. The processor 212 may exit the wear reduction mode when the calculated pitch angle differs from the locked angle by more than half of a degree, 1 degree, 2 degrees, etc. In some embodiments, the exit condition may be detected when changes to the operating parameter of the secondary effector device 450 is insufficient to meet the target engine parameter demand. For example, if the throttle is placed on burst, the processor 212 may determine that maximizing an electric motor output is insufficient to generate desired thrust and unlock the pitch actuators to increase thrust.

If an exit condition is not detected, the engine system 400 continues to operate in wear reduction mode in step 540. If an exit condition is detected in step 546, the engine system 400 returns to the normal operating mode in step 510. Generally, the engine can enter and exit wear reduction mode any number of times during a flight.

Figure 6:
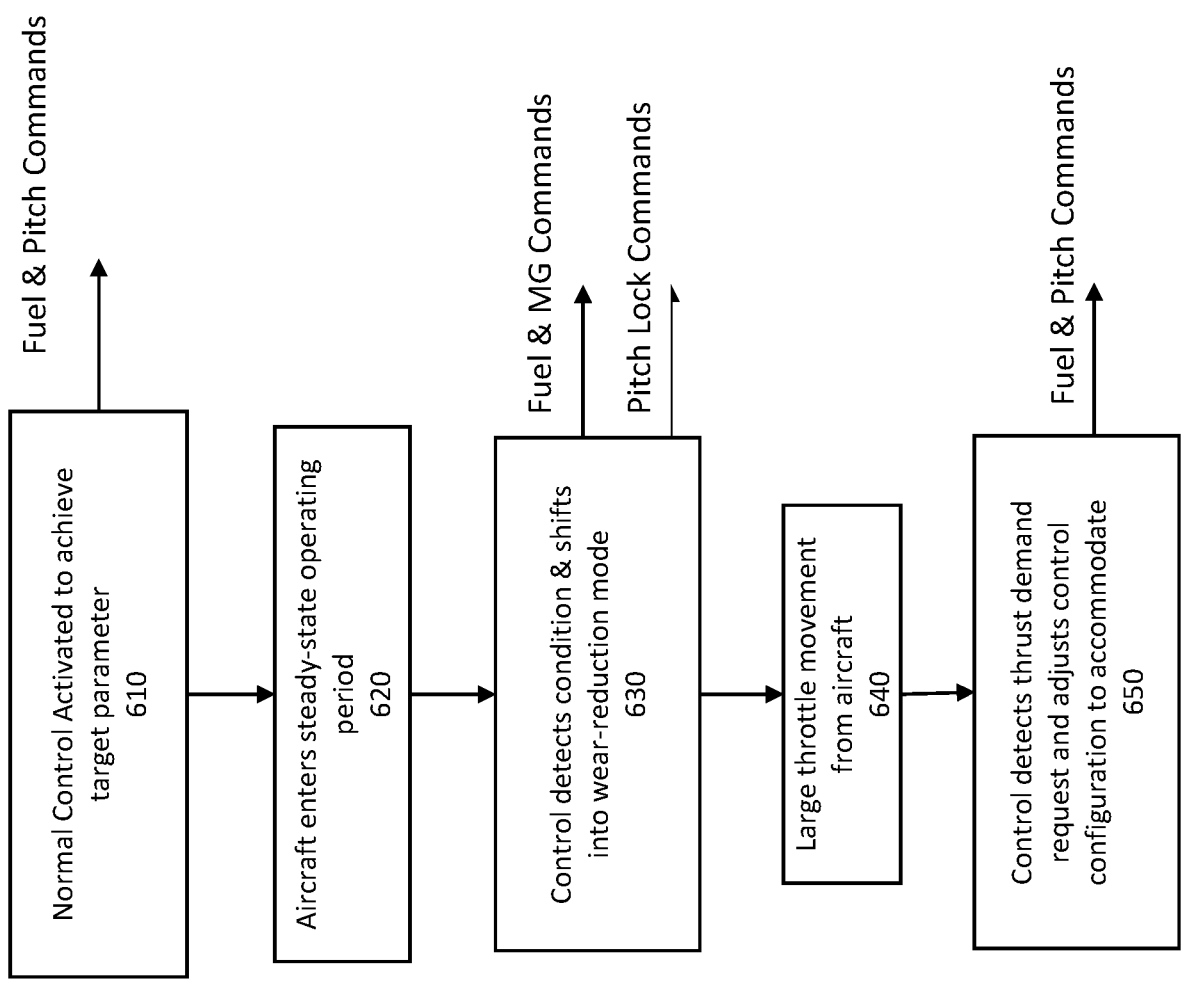
FIG. 6 is a flow diagram of a method for wear reduction according to some embodiments.

Next referring to FIG. 6, a method for engine wear reduction is shown. In some embodiments, one or more steps of FIG. 6 may be performed with a processor-based control system of an engine such as the computing system 210 of the engine 10 and/or the processor 212 of the engine system 400. In some embodiments, in FIG. 6 the pitch actuator may be a primary effector device 440 and the motor generator may be a secondary effector device 450 as described herein.

In step 610, in a normal operating mode, the normal control is activated to achieve target engine parameter. In the normal operating mode, commands are sent to both fuel controls and pitch actuator controls. In some embodiments, the fuel and pitch controls are in closed control loops with the target engine parameter.

In step 620, the aircraft enters a steady-state operating period. In some embodiments, the steady-state operating period may correspond to steady climb, cruise, and/or descent.

In step 630, the processor 212 detects a trigger condition and shifts into wear reduction mode. In some embodiments, the wear reduction mode may also be referred to as a small signal efficiency mode where the engine system 400 is controlled for efficiency based on small signal changes. In the wear reduction mode, the pitch controls may be hardware or software locked and the processor 212 controls only the fuel system and the motor generator in response to target engine parameter changes. In some embodiments, the pitch actuator may instead be controlled in an open loop or at a reduced bandwidth.

In step 640, a large throttle movement from the aircraft is detected. In some embodiments, the throttle movement may be from the pilot or from an auto-throttle system. In step 650, the processor 212 detects the change in thrust demand request and adjusts the control configuration back to the normal operating mode to accommodate for the change. In the normal operating mode, the processor 212 again sends commands to the fuel system and the pitch actuator to meet the demand of the target engine parameter changes.

Figure 7:
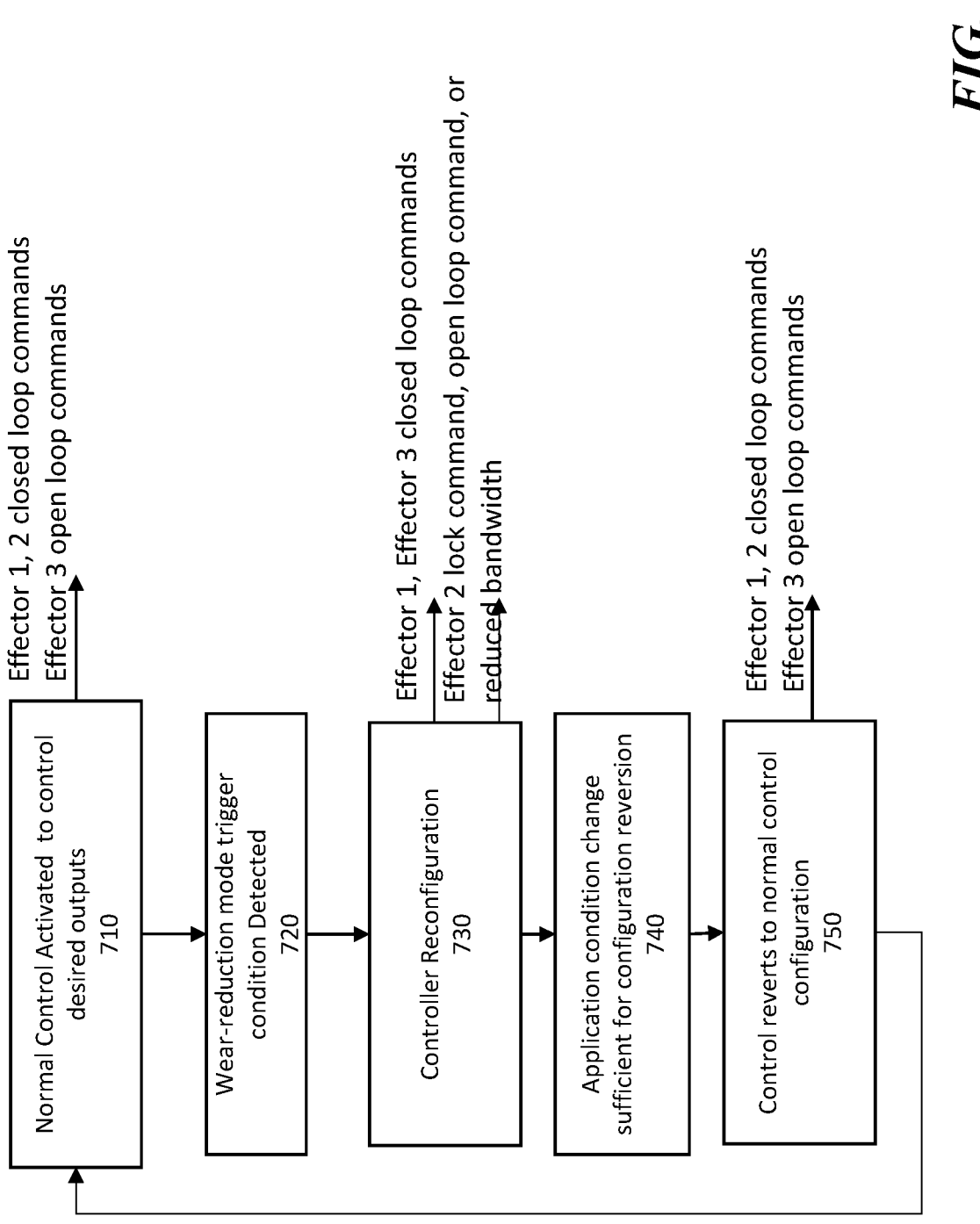
FIG. 7 is a flow diagram of a method for wear reduction according to some embodiments.

Next referring to FIG. 7, a method for engine wear reduction is shown. In some embodiments, one or more steps of FIG. 7 may be performed with a processor-based control system of an engine such as the computing system 210 of the engine 10 and/or the processor 212 of the engine system 400. In some embodiments, in FIG. 7 the effector 2 may be a primary effector device 440 and the effector 3 may be a secondary effector device 450 as described herein.

In step 710, in a normal operating mode, the nominal control is activated to achieve the target engine parameter. In the normal operating mode, commands are sent to effectors 1 and 2 in a closed loop command, while effector 3 is in an open loop command.

In step 720, a wear reduction trigger condition is detected. In some embodiments, a wear reduction mode trigger condition may include any condition that allows for effector 2 to be operated in a way to extend the life of the effector while meeting the target engine parameter. In step 730, the controller reconfigures by switching to a wear reduction mode. In the wear reduction mode, effector 1 and effector 3 are operated via closed-loop commands while effector 2 is locked, operated via an open loop command, or change-rate limited (e.g., reduced bandwidth).

In step 740, the processor 212 determines that application condition change is sufficient for configuration reversion. In some embodiments, if a wear reduction mode exit trigger is detected in step 740, the controls revert back to normal operating mode in step 750. In the normal operating mode, the processor 212 again controls effectors 1 and 2 in a closed loop command and effector 3 in an open loop command.

Figure 8:
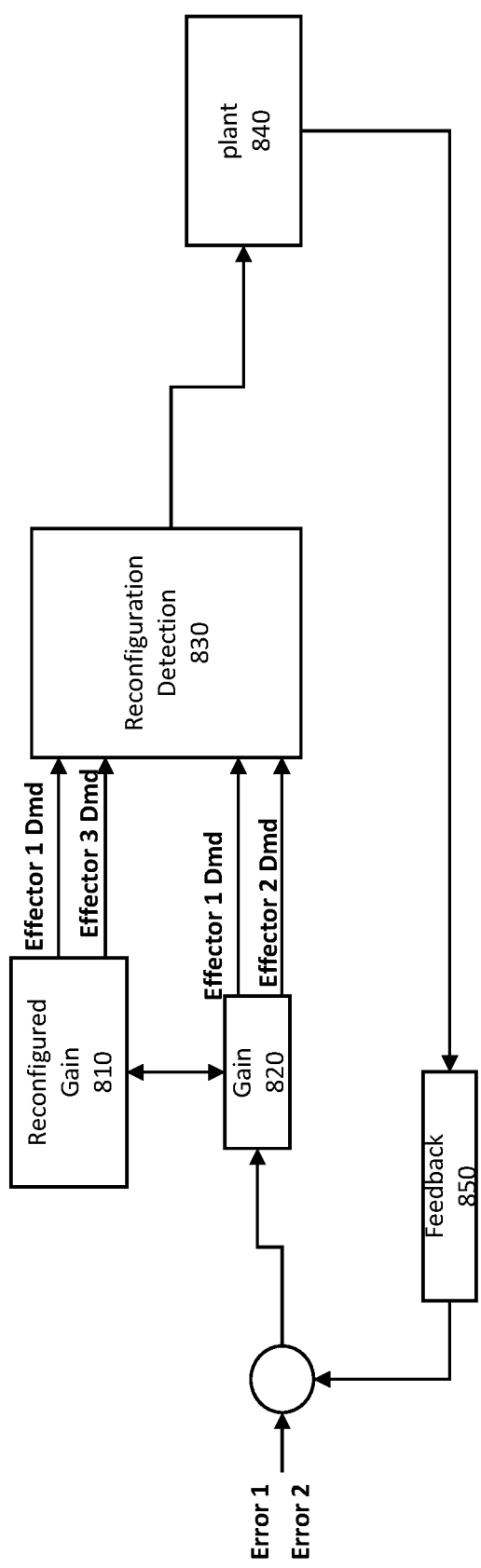
FIG. 8 is a process diagram for wear reduction according to some embodiments.

Next referring to FIG. 8, a process for engine wear reduction is shown. In some embodiments, one or more steps of FIG. 8 may be performed with a processor-based control system of an engine such as the computing system 210 of the engine 10 and/or the processor 212 of the engine system 400. In some embodiments, in FIG. 8 the effector 2 may be a primary effector device 440 and the effector 3 may be a secondary effector device 450 as described herein.

In FIG. 8, the processor 212 first detects for errors, or mismatches between a target engine parameter and the current engine output. The processor 212 then calculates the gain 820 for effector 1 and effector 2 to respond to the changes in target engine parameters. The further calculates the reconfigured gain 820 for effector 1 and effector 3 to respond to the changes in target engine parameters. Reconfiguration detection 830 is then performed to determine whether the engine is to operate in a normal operating mode or a wear reduction mode. For example, the processor 212 may determine whether the sensors of the aircraft indicate a steady-state operation. For example, the processor may determine whether the target engine parameter can be achieved based on reconfigured gain 810. Plant mode 840 is then determined based on the gain 820 or reconfigured gain 810 according to the selected mode. The outputs of the engine are provided as feedback 850 for subsequent determinations of gain 820 and reconfigured gain 810.

Figure 9:
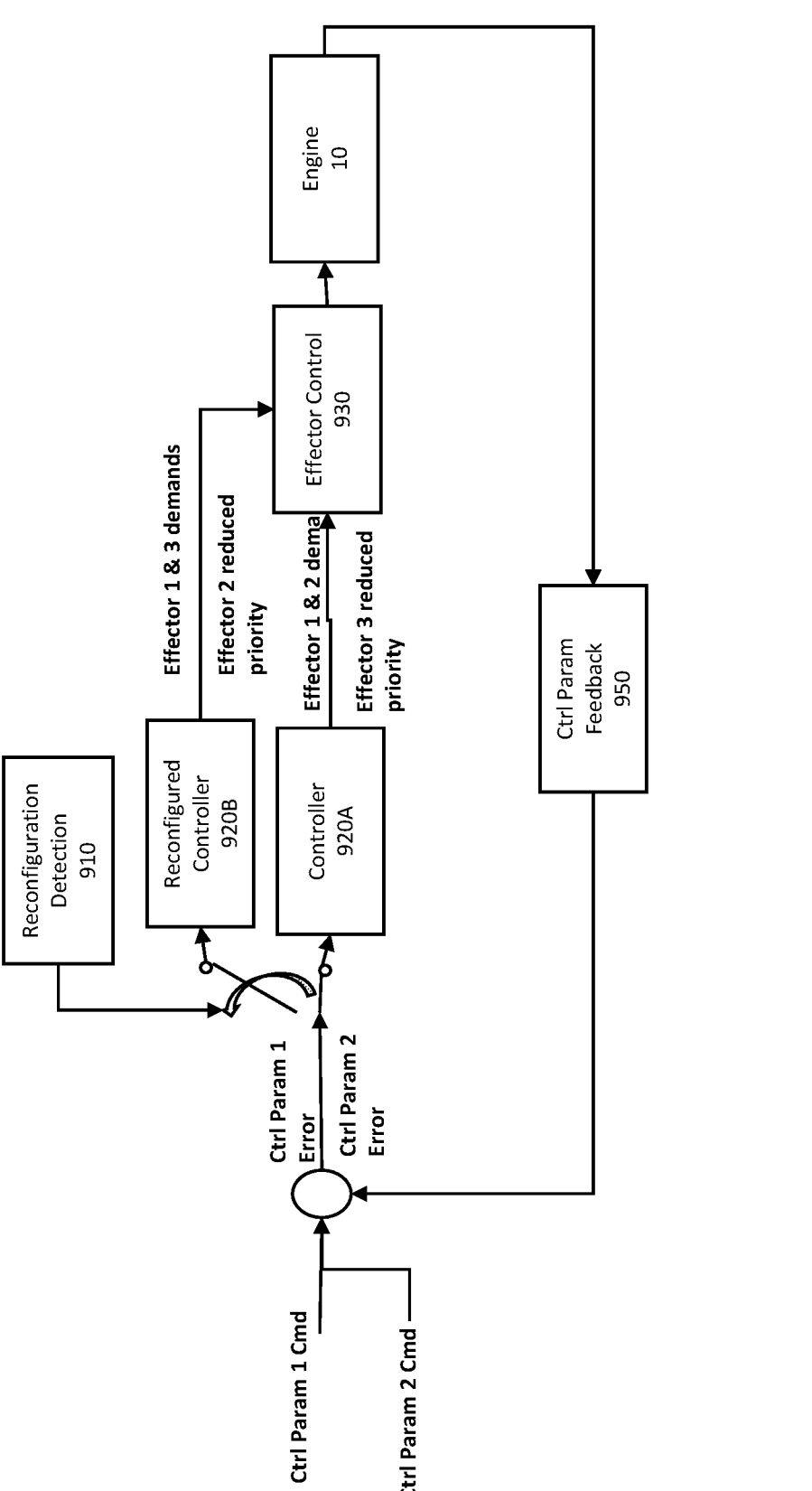
FIG. 9 is a process diagram for wear reduction according to some embodiments.

Next referring to FIG. 9, a process for engine wear reduction is shown. In some embodiments, one or more steps of FIG. 9 may be performed with a processor-based control system of an engine such as the computing system 210 of the engine 10 and/or the processor 212 of the engine system 400. In some embodiments, in FIG. 8 the effector 2 may be a primary effector device 440 and the effector 3 may be a secondary effector device 450 as described herein.

In FIG. 9, the control parameters 1 and 2 are received at a processor 212. The processor 212 detects errors or mismatches in the control parameters and, based on reconfiguration detection 910, determines whether to operate as a normal controller 920A or a reconfigured controller 920B for wear reduction. As a normal controller 920A operating in a normal operating mode, effectors 1 and 2 are controlled to meet the demand of the target engine parameter changes, while effector 3 is reduced in priority. For example, effector 3 may be controlled at a reduced bandwidth and/or maintained at a fixed configuration. As a reconfigured controller 920A operating in a wear reduction mode, effectors 1 and 3 are controlled to meet the demand of the target engine parameter changes, and effector 2 is reduced in priority. For example, effector 2 may be controlled at a reduced bandwidth, in an open loop, or maintained at a fixed configuration. In some embodiments, the operating parameters of effector 2 may only be changed when effector 1 and effector 3 are insufficient to achieve the target engine parameter changes. The commands are provided to an effector control 930 to affect the output of the engine 10. The control parameter feedback 950 from the engine is provided back to the processor 212 for subsequent determinations of controls and commands f effectors 1, 2, and 3.

Figures 10A, 10B:
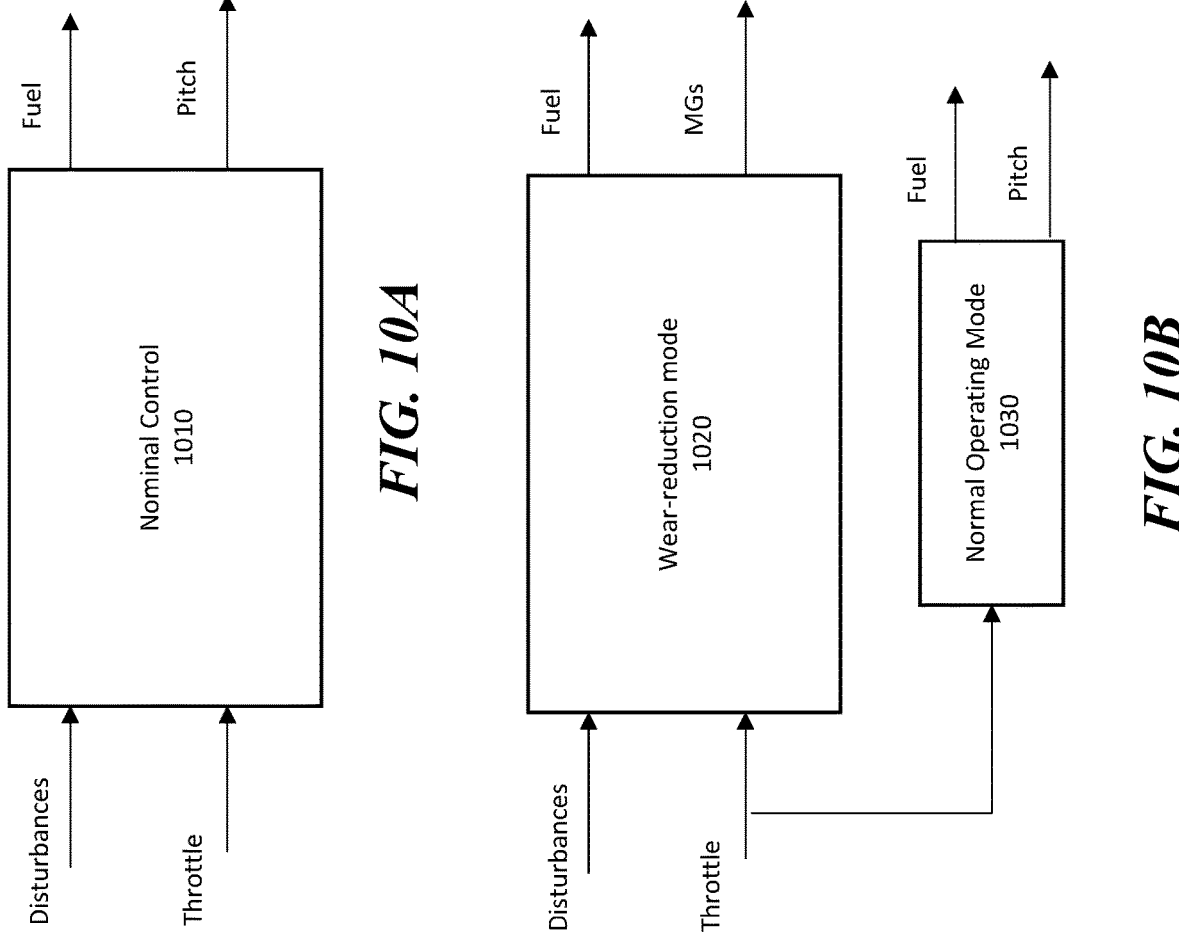
FIGS. 10A and 10B are illustrations of engine control schemes in accordance with some embodiments.

Next referring to FIGS. 10A and 10B, illustrations of engine controls are shown. FIG. 10A illustrates a conventional system where the nominal control 1010 of an engine system responds to disturbances and throttle changes with both fuel controls and pitch controls via closed-loop command. For example, fuel and pitch actuator controls may be continuously adjusted based on changes in throttle and disturbances. FIG. 10B illustrates an engine system 400 with a wear reduction mode 1020 and a normal operating mode 1030. When the engine system 400 is experiencing large throttle changes, the engine system 400 operates in the normal operating mode and responds to disturbances and throttle changes with both fuel controls and pitch controls via closed-loop command, similar or identical to the control scheme of nominal control 1010. However, when throttle changes are small (e.g. less than 2% or 5%) over an extended period of time, the system operates in a wear reduction mode 1020 and responds to the small throttle changes with fuel controls and motor generator controls in a closed loop command. The pitch controls may be locked, in an open loop command, or change-rate limited.

Figure 11A:
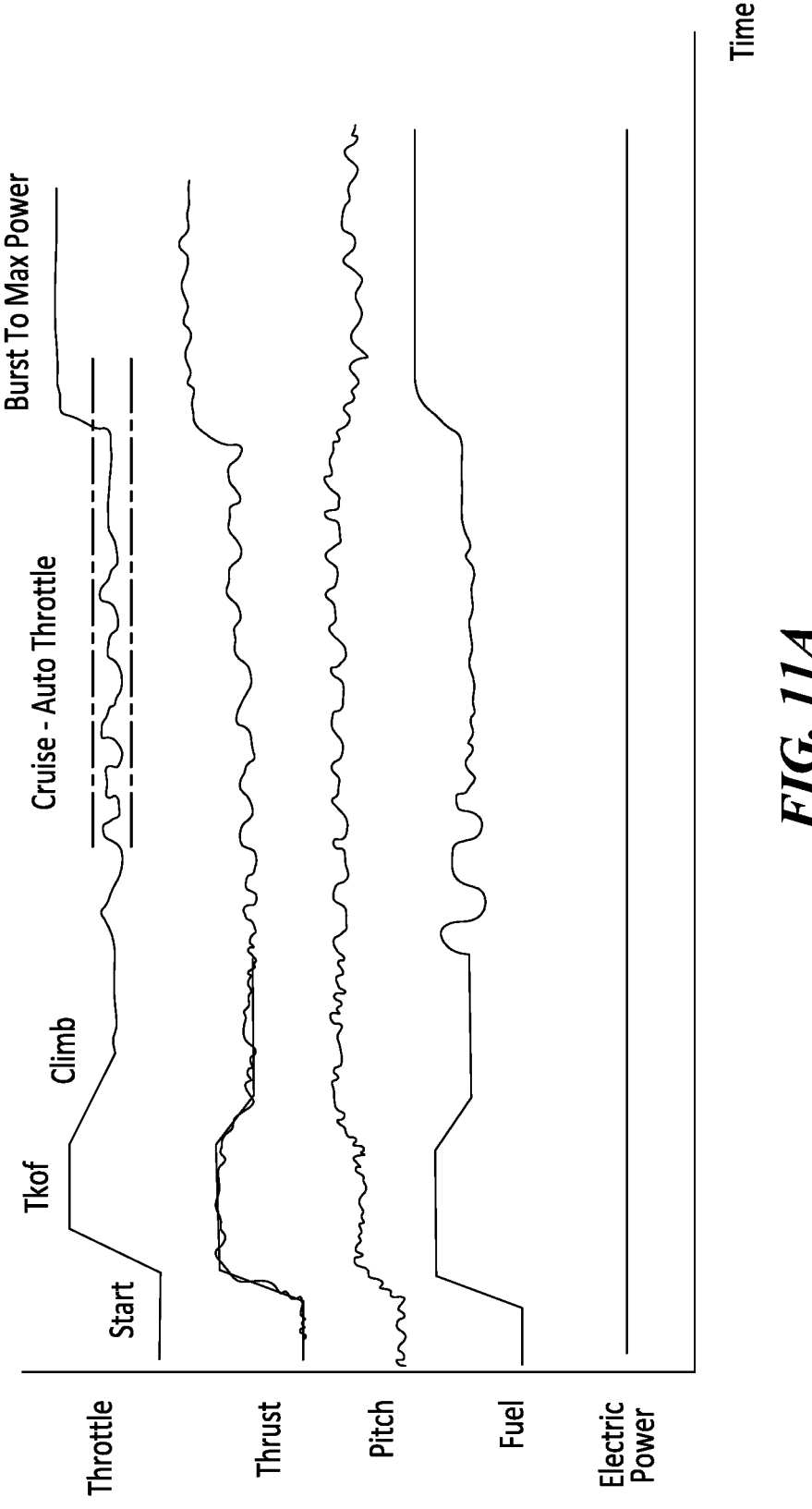
FIGS. 11A and 11B are illustrations of engine parameters over time in accordance with some embodiments.
Figure 11B:
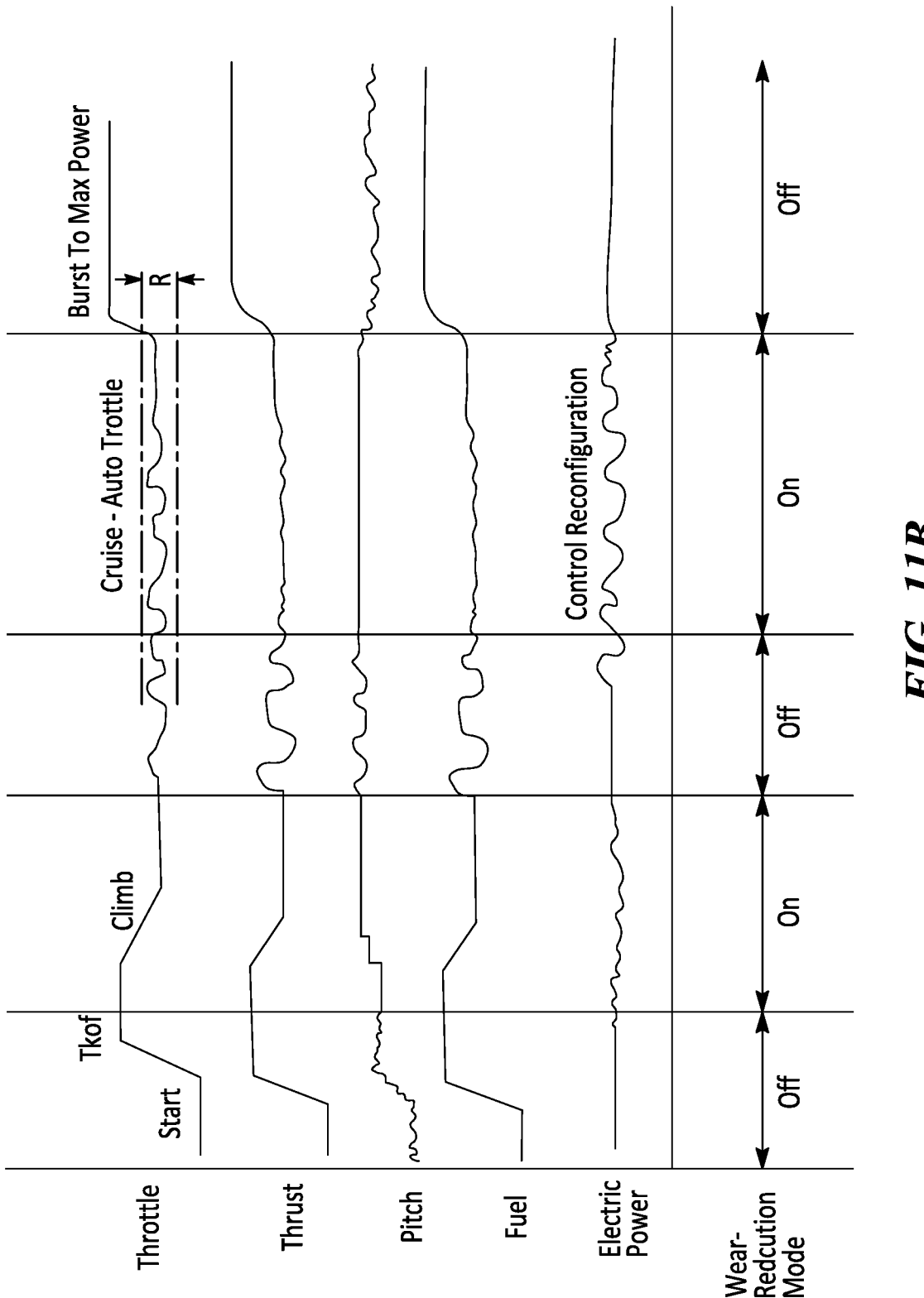

Next referring to FIGS. 11A and 11B, illustrations of engine parameters over time are shown. The x-axis values of the engine parameters in FIGS. 11A and 11B are illustrated to show relative changes only and do not necessarily correspond to numerical values. For example, the line for throttle may represent increases and decreases in the power setting of the engine, the line for thrust may represent increases and decreases in engine thrust output, the line for pitch may represent increases and decreases of variable pitch blade angles, the line for fuel may represent increases and decreases in fuel injection rate, and the line for electric power may represent increases and decreases in electric generator output over time.

FIG. 11A illustrates engine parameters of a conventional engine without a wear reduction mode. In FIG. 11A, changes in throttle settings, thrust, pitch angles, fuel rate, and electric power through the periods of take-off, climb, cruise, and burst are shown. As shown in FIG. 11A, in a conventional engine, pitch and fuel controls of the engine are adjusted in each phase to affect the thrust of the engine to meet the throttle demand. Particularly, during each phase, the pitch actuator continuously adjusts the pitch angles in response to large and small changes in throttle. These high-frequency adjustments can cause significant wear on the pitch actuator and blade components. The electric power generator output remains substantially constant through each of the phases.

FIG. 11B illustrates an engine configured to enter and exit wear reduction mode during flight. In FIG. 11B, between engine start and take-off, the wear reduction mode is off and the engine operates in normal operating mode. The changes in thrust, pitch, fuel, and electric power may be similar or identical to those shown in FIG. 11A in the normal operating mode.

Between take off and climb, the wear reduction mode is triggered, and the pitches of the variable blades are change rate limited. As shown in FIG. 11B, in contrast to the high frequency changes of pitch during the climb phase shown in FIG. 11A, the pitch is controlled to have low bandwidth step-wise changes. Also during this phase, the electric power generator functions as a secondary effector device and adjusts its output in response to the change in throttle.

In the period following climb, the engine returns to normal operating mode and the pitch of the variable blades are again controlled in a closed control loop with throttle such that it responds to large and small changes of throttle with short response time (e.g., less than 1 second, 2 seconds, etc.). After the aircraft enters cruise, the wear reduction mode is again triggered, and the pitch of the variable pitch blades are locked for the duration of cruise phase. During this phase, the electric power generator compensates for the effect of the pitching of the variable pitch blades to respond to changes in autothrottle. In some embodiments, the engine may remain in the wear reduction mode as long as throttle remains within a baseline range R (e.g. 2%, 3%, 5%, etc.)

When throttle exceeds the baseline range R, for example, if a flight condition requires a burst to max power, the engine exits wear reduction mode and returns to normal operating mode. The pitch of the variable pitch blades unlocks and returns to being in a closed-loop control with throttle to affect thrust. Also in this phase, the electric power generator returns to baseline and is not controlled to respond to throttle demand.

As shown in FIGS. 11A and 11B, an engine with a wear reduction significantly reduces the motion of the pitch actuator over the duration of flight while maintaining the thrust output of the engine in response to throttle control. The reduce motion of the actuator leads to reduced wear and prolong life cycle of the actuator.

In some aspects, the systems and methods described herein reduces engine effector and/or actuator wear by reconfiguring the controls of the effectors in specific operating conditions to temporarily replace the primary effector-driven controls with a secondary effector while maintaining a target engine parameter, such as thrust. By selectively switching to a wear-reduction mode, the controller can reduce wear associated with repeated actuations to prolong the life cycle of the primary effector. The output of the engine can be preserved by controlling a secondary effector to compensate for the effect of a locked or change-rate limited primary effector.

Further aspects of the disclosure are provided by the subject matter of the following clauses:

An engine system including: a pitch actuator configured to affect a pitch of a plurality of variable pitch blades of an engine; a secondary thrust effector device; and a processor communicatively coupled to the pitch actuator and the secondary thrust effector device, the processor being configured to: change the pitch of the plurality of variable pitch blades via the pitch actuator in response to changes in a target engine parameter a normal operating mode; detect a trigger condition for a wear reduction mode; and in response to the trigger condition being detected, switch from the normal operating mode to the wear reduction mode, wherein in the wear reduction mode, the pitch of the plurality of variable pitch blades is maintained at a first angle, and the secondary thrust effector device is controlled in response to the changes in the target engine parameter.

An engine system including: a pitch actuator configured to affect a pitch of a plurality of variable pitch blades; a pitch-locking mechanism configured to selectively engage to limit a pitching of the plurality of variable pitch blades; and a processor communicatively coupled to the pitch actuator and the pitch-locking mechanism, the processor being configured to: change the pitch of the plurality of variable pitch blades via the pitch actuator in response to changes in a target engine parameter while the pitch-locking mechanism is disengaged; detect a trigger condition for a steady-state mode, the trigger condition including the target engine parameter being within a predetermined range over a period of time; and in response to the trigger condition being detected, cause the pitch-locking mechanism to engage to limit the pitching of the plurality of variable pitch blades.

An engine system including: a pitch actuator configured to affect a pitch of a plurality of variable pitch blades of an engine; a secondary thrust effector device; and a processor communicatively coupled to the pitch actuator and the secondary thrust effector device, the processor being configured to: change the pitch of the plurality of variable pitch blades via the pitch actuator in response to changes in a target engine output in a normal operating mode; detect a trigger condition for a pitch-lock mode; and in response to the trigger condition being detected, switch from the normal operating mode to the pitch-lock mode, wherein in the pitch-lock mode, the allowable rate of change in pitch of the plurality of variable pitch blades or the bandwidth of the pitch actuation loop is reduced, and the bandwidth of the secondary thrust effector device is increased to respond to the changes in the target engine output.

The system of any preceding clause, wherein, the trigger condition includes the target engine parameter being within a predetermined range during a period of time.

The system of any preceding clause, wherein the predetermined range includes a 5% change in the target engine parameter.

The system of any preceding clause, wherein the period of time includes at least 1 minute.

The system of any preceding clause, wherein the trigger condition includes a threshold altitude, a threshold Mach number, and/or a throttle position.

The system of any preceding clause, wherein the engine system further includes a mechanical pitch-locking mechanism; and wherein in the wear reduction mode, the mechanical pitch-locking mechanism is engaged to limit the pitching of the plurality of variable pitch blades.

The system of any preceding clause, wherein the pitch of the plurality of variable pitch blades is maintained at a first angle based on control signals sent from the processor to the pitch actuator.

The system of any preceding clause, wherein the plurality of variable pitch blades includes fan blades of an open rotor engine.

The system of any preceding clause, wherein the secondary thrust effector device includes a fuel injection controller, an electric motor generator, inlet guide vanes, outlet guide vanes, and/or bleed valves.

The system of any preceding clause, wherein in response to the same amount of change in the target engine parameter, the secondary thrust effector device is controlled to cause a greater effect on an output parameter of the engine in the wear reduction mode as compared to the normal operating mode.

The system of any preceding clause, wherein the processor is further configured to: detect an exit condition for the wear reduction mode, wherein the exit condition includes a change of the target engine parameter exceeding an exit threshold; and in response to detecting the exit condition, switch from the wear reduction mode to the normal operating mode.

The system of any preceding clause, wherein the processor is further configured to determine an engine parameter baseline based on values of the target engine parameter over a period of time, wherein the exit condition is detected based on the change from the engine parameter baseline.

The system of any preceding clause, wherein the processor is further configured to: determine, while in the wear reduction mode, target pitch angles for the plurality of variable pitch blades based on flight conditions and the target engine parameter; switch from the wear reduction mode to an adjustment mode in the event that an average target pitch angle in a time window deviates from the first angle for more than a threshold amount; and change, in the adjustment mode, the angles of the plurality of variable pitch blades from the first angle to the average target pitch angle; and in response to the plurality of variable pitch blades being pitched to the average target pitch angle, switch to the wear reduction mode.

The system of any preceding clause, wherein in the wear reduction mode, the pitch of the plurality of variable pitch blades is maintained at the first angle with changes of the target engine parameter of up to 5%.

The system of any preceding clause, wherein in the wear reduction mode, the pitch of the plurality of variable pitch blades is maintained at the first angle for at least five minutes, at least ten minutes, or at least twenty minutes.

The system of any preceding clause, wherein in the normal operating mode, the pitch actuator is in a closed command loop with the target engine parameter and the secondary thrust effector is in an open command loop The system of any preceding clause, wherein in the wear reduction mode, the secondary thrust effector device is in a closed command loop with the target engine parameter and the pitch actuator is in an open command loop.

The system of any preceding clause, wherein the target engine parameter is received from an auto-throttle system and/or determined based on a pilot throttle control.

The system of any preceding clause, wherein the target engine parameter is determined based on flight conditions measured by a sensor system and a target speed.

The system of any preceding clause, wherein the trigger condition of the wear reduction mode corresponds to a cruising condition of an aircraft of the engine system.

The system of any preceding clause, wherein the target engine parameter includes thrust, speed, torque, power, pressure, and/or pressure ratio parameters A method for engine operation including: change, via a pitch actuator, a pitch of a plurality of variable pitch blades of an engine system in response to changes in a target engine parameter in a normal operating mode; detect, at a processor communicatively coupled to the pitch actuator and a secondary thrust effector device, a trigger condition for a wear reduction mode; and in response to the trigger condition being detected, switch from the normal operating mode to the wear reduction mode, wherein in the wear reduction mode, the pitch of the plurality of variable pitch blades is maintained at a first angle and the secondary thrust effector device is controlled in response to the changes in the target engine parameter.

A method for engine operation including: change, via a pitch actuator, a pitch of a plurality of variable pitch blades of an engine system in response to changes in a target engine parameter in a normal operating mode; detect, at a processor communicatively coupled to the pitch actuator and a secondary thrust effector device, a trigger condition for a wear reduction mode; and in response to the trigger condition being detected, switch from the normal operating mode to the wear reduction mode, wherein in the pitch-lock mode, the allowable rate of change in pitch of the plurality of variable pitch blades or the bandwidth of the pitch actuation loop is reduced, and the bandwidth of the secondary thrust effector device is increased to respond to the changes in the target engine output.

The method of any preceding clause, wherein, the trigger condition includes the target engine parameter being within a predetermined range during a period of time.

The method of any preceding clause, wherein the predetermined range includes a 5% change in the target engine parameter.

The method of any preceding clause, wherein the period of time includes at least 1 minute.

The method of any preceding clause, wherein the trigger condition includes a threshold altitude, a threshold Mach number, and/or a throttle position.

The method of any preceding clause, wherein in the wear reduction mode, a mechanical pitch-locking mechanism is engaged to limit the pitching of the plurality of variable pitch blades.

The method of any preceding clause, wherein the pitch of the plurality of variable pitch blades is maintained at a first angle based on control signals sent from the processor to the pitch actuator.

The method of any preceding clause, wherein the plurality of variable pitch blades includes fan blades of an open rotor engine.

The method of any preceding clause, wherein the secondary thrust effector device includes a fuel injection controller, an electric motor generator, inlet guide vanes, outlet guide vanes, and/or bleed valves.

The method of any preceding clause, wherein in response to the same amount of change in the target engine parameter, the secondary thrust effector device is controlled to cause a greater effect on an output parameter of the engine in the wear reduction mode as compared to the normal operating mode.

The method of any preceding clause, further including: detecting an exit condition for the wear reduction mode, wherein the exit condition includes a change of the target engine parameter exceeding an exit threshold; and in response to detecting the exit condition, switching from the wear reduction mode to the normal operating mode.

The method of any preceding clause, further including: determining an engine parameter baseline based on values of the target engine parameter over a period of time, wherein the exit condition is detected based on the change from the engine parameter baseline.

The method of any preceding clause, further including: determining, while in the wear reduction mode, target pitch angles for the plurality of variable pitch blades based on flight conditions and the target engine parameter; switching from the wear reduction mode to an adjustment mode in the event that an average target pitch angle in a time window deviates from the first angle for more than a threshold amount; and changing, in the adjustment mode, the angles of the plurality of variable pitch blades from the first angle to the average target pitch angle; and in response to the plurality of variable pitch blades being pitched to the average target pitch angle, switch to the wear reduction mode.

The method of any preceding clause, wherein in the wear reduction mode, the pitch of the plurality of variable pitch blades is maintained at the first angle with changes of the target engine parameter of up to 5%.

The method of any preceding clause, wherein in the wear reduction mode, the pitch of the plurality of variable pitch blades is maintained at the first angle for at least five minutes, at least ten minutes, or at least twenty minutes.

The method of any preceding clause, wherein in the normal operating mode, the pitch actuator is in a closed command loop with the target engine parameter and the secondary thrust effector is in an open command loop The method of any preceding clause, wherein in the wear reduction mode, the secondary thrust effector device is in a closed command loop with the target engine parameter and the pitch actuator is in an open command loop.

The method of any preceding clause, wherein the target engine parameter is received from an auto-throttle system and/or determined based on a pilot throttle control.

The method of any preceding clause, wherein the target engine parameter is determined based on flight conditions measured by a sensor system and a target speed.

The method of any preceding clause, wherein the trigger condition of the wear reduction mode corresponds to a cruising condition of an aircraft of the engine system.

The method of any preceding clause, wherein the target engine parameter includes thrust, speed, torque, power, pressure, and/or pressure ratio parameters An engine system including: a first effector device; a second effector device; and a processor communicatively coupled to the first effector device and the second effector device, the processor being configured: operate in a normal operating mode; switching from the normal operating mode to a wear reduction mode in response to detecting a trigger condition for a wear reduction mode; and switching from the wear reduction mode to the normal operating mode in response to detecting an exit condition for the wear reduction mode; wherein in the normal operating mode, the first effector device is controlled to respond to changes in a target engine parameter; and wherein in the wear reduction mode, the first effector device is not controlled to respond to changes in the target engine parameter, and the second effector device is controlled to compensate for an effect of the first effector device on the target engine parameter in response to changes in the target engine parameter.

An engine system including: a first effector device; a second effector device; and a processor communicatively coupled to the first effector device and the second effector device, the processor being configured: operate in a normal operating mode; switching from the normal operating mode to a wear reduction mode in response to detecting a trigger condition for a wear reduction mode; and switching from the wear reduction mode to the normal operating mode in response to detecting an exit condition for the wear reduction mode; wherein in the normal operating mode, the first effector device is controlled to respond to changes in a target engine parameter; and wherein in the wear reduction mode, the allowable rate of change or the bandwidth of a control loop of the first effector device is reduced, and the bandwidth of a control loop of the second thrust effector device is increased to respond to the changes in the target engine output.

The system of any preceding clause, wherein, the trigger condition includes the target engine parameter being within a predetermined range during a period of time.

The system of any preceding clause, wherein the predetermined range includes a 5% change in the target engine parameter.

The system of any preceding clause, wherein the period of time includes at least 1 minute.

The system of any preceding clause, wherein the trigger condition includes a threshold altitude, a threshold Mach number, and/or a throttle position.

The system of any preceding clause, wherein the second effector device includes a fuel injection controller, an electric motor generator, inlet guide vanes, outlet guide vanes, and/or bleed valves.

The system of any preceding clause, wherein in response to the same amount of change in the target engine parameter, the second effector device is controlled to cause a greater effect on an output parameter of the engine in the wear reduction mode as compared to the normal operating mode.

The system of any preceding clause, wherein the processor is further configured to: detect an exit condition for the wear reduction mode, wherein the exit condition includes a change of the target engine parameter exceeding an exit threshold; and in response to detecting the exit condition, switch from the wear reduction mode to the normal operating mode.

The system of any preceding clause, wherein the processor is further configured to determine an engine parameter baseline based on values of the target engine parameter over a period of time, wherein the exit condition is detected based on the change from the engine parameter baseline.

The system of any preceding clause, wherein the processor is further configured to: determine, while in the wear reduction mode, a target first effector parameter based on flight conditions and the target engine parameter; switch from the wear reduction mode to an adjustment mode in the event that an average target first effector parameter in a time window deviates from a baseline for more than a threshold amount; and change, in the adjustment mode, the first effector from to the average target first effector parameter; and in response to the first effector device being actuated to the average first effector parameter, switch to the wear reduction mode.

The system of any preceding clause, wherein in the normal operating mode, the first effector device in a closed command loop with the target engine parameter and the second effector device is in an open command loop The system of any preceding clause, wherein in the wear reduction mode, the second effector device is in a closed command loop with the target engine parameter and the first effector device is in an open command loop.

The system of any preceding clause, wherein the target engine parameter is received from an auto-throttle system and/or determined based on a pilot throttle control.

The system of any preceding clause, wherein the target engine parameter is determined based on flight conditions measured by a sensor system and a target speed.

The system of any preceding clause, wherein the trigger condition of the wear reduction mode corresponds to a cruising condition of an aircraft of the engine system.

The system of any preceding clause, wherein the target engine parameter includes thrust, speed, torque, power, pressure, and/or pressure ratio parameters The system of any preceding clause, wherein the first effector device includes a fuel injector, a plurality of variable stator vanes, a plurality of inset guide vanes, a plurality of outlet guide vanes, or a variable nozzle.

The system of any preceding clause, wherein the second effector device includes a motor generator, a plurality of inlet guide vanes, a plurality of outlet guide vanes, or a plurality of bleed valves.

The system of any preceding clause, wherein the target engine parameter includes target trust output, speed, torque, power pressure, and/or pressure ratio.

A method for controlling an engine system including: operate, with a processor of the engine system, in a normal operating mode; switching from the normal operating mode to a wear reduction mode in response to detecting a trigger condition for a wear reduction mode; and switching from the wear reduction mode to the normal operating mode in response to detecting an exit condition for the wear reduction mode; wherein in the normal operating mode, the first effector device is controlled to respond to changes in a target engine parameter; and wherein in the wear reduction mode, the first effector device is not controlled to respond to changes in the target engine parameter, and the second effector device is controlled to compensate for an effect of the first effector device on the target engine parameter in response to changes in the target engine parameter.

A method for controlling an engine system including: operate, with a processor of the engine system, in a normal operating mode; switching from the normal operating mode to a wear reduction mode in response to detecting a trigger condition for a wear reduction mode; and switching from the wear reduction mode to the normal operating mode in response to detecting an exit condition for the wear reduction mode; wherein in the normal operating mode, the first effector device is controlled to respond to changes in a target engine parameter; and wherein in the wear reduction mode, the allowable rate of change or the bandwidth of a control loop of the first effector device is reduced, and the bandwidth of a control loop of the second thrust effector device is increased to respond to the changes in the target engine output.

The method of any preceding clause, wherein, the trigger condition includes the target engine parameter being within a predetermined range during a period of time.

The method of any preceding clause, wherein the predetermined range includes a 5% change in the target engine parameter.

The method of any preceding clause, wherein the period of time includes at least 1 minute.

The method of any preceding clause, wherein the trigger condition includes a threshold altitude, a threshold Mach number, and/or a throttle position.

The method of any preceding clause, wherein the second effector device includes a fuel injection controller, an electric motor generator, inlet guide vanes, outlet guide vanes, and/or bleed valves.

The method of any preceding clause, wherein in response to the same amount of change in the target engine parameter, the second effector device is controlled to cause a greater effect on an output parameter of the engine in the wear reduction mode as compared to the normal operating mode.

The method of any preceding clause, further including: detecting an exit condition for the wear reduction mode, wherein the exit condition includes a change of the target engine parameter exceeding an exit threshold; and in response to detecting the exit condition, switching from the wear reduction mode to the normal operating mode.

The method of any preceding clause further including: determining an engine parameter baseline based on values of the target engine parameter over a period of time, wherein the exit condition is detected based on the change from the engine parameter baseline.

The method of any preceding clause, further including: determining, while in the wear reduction mode, a target first effector parameter based on flight conditions and the target engine parameter; switching from the wear reduction mode to an adjustment mode in the event that an average target first effector parameter in a time window deviates from a baseline for more than a threshold amount; and changing, in the adjustment mode, the first effector from to the average target first effector parameter; and in response to the first effector device being actuated to the average first effector parameter, switch to the wear reduction mode.

The method of any preceding clause, wherein in the normal operating mode, the first effector device in a closed command loop with the target engine parameter and the second effector device is in an open command loop The method of any preceding clause, wherein in the wear reduction mode, the second effector device is in a closed command loop with the target engine parameter and the first effector device is in an open command loop.

The method of any preceding clause, wherein the target engine parameter is received from an auto-throttle system and/or determined based on a pilot throttle control.

The method of any preceding clause, wherein the target engine parameter is determined based on flight conditions measured by a sensor system and a target speed.

The method of any preceding clause, wherein the trigger condition of the wear reduction mode corresponds to a cruising condition of an aircraft of the engine system.

The method of any preceding clause, wherein the target engine parameter includes thrust, speed, torque, power, pressure, and/or pressure ratio parameters The method of any preceding clause, wherein the first effector device includes a fuel injector, a plurality of variable stator vanes, a plurality of inset guide vanes, a plurality of outlet guide vanes, or a variable nozzle.

The method of any preceding clause, wherein the second effector device includes a motor generator, a plurality of inlet guide vanes, a plurality of outlet guide vanes, or a plurality of bleed valves.

The method of any preceding clause, wherein the target engine parameter includes target trust output, speed, torque, power pressure, and/or pressure ratio.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

The invention claimed is:

1. An engine system comprising:
   a pitch actuator configured to affect a pitch of a plurality of variable pitch blades of an engine;
   a secondary thrust effector device; and
   a processor communicatively coupled to the pitch actuator and the secondary thrust effector device, the processor being configured to:
   change the pitch of the plurality of variable pitch blades via the pitch actuator in response to changes in a target engine parameter in a normal operating mode;
   detect a trigger condition for a wear reduction mode; and
   in response to the trigger condition being detected, switch from the normal operating mode to the wear reduction mode, wherein in the wear reduction mode, the pitch of the plurality of variable pitch blades is maintained at a first angle, and the secondary thrust effector device is controlled in response to the changes in the target engine parameter to compensate for an effect of the pitch actuator on the target engine parameter, wherein, the trigger condition comprises the target engine parameter being within a predetermined range during a period of time.

2. The system of claim 1, wherein the trigger condition comprises a threshold altitude, a threshold Mach number, and/or a throttle position.

3. The system of claim 1, wherein the engine system further comprises a mechanical pitch-locking mechanism; and wherein in the wear reduction mode, the mechanical pitch-locking mechanism is engaged to limit pitching of the plurality of variable pitch blades.

4. The system of claim 1, wherein the pitch of the plurality of variable pitch blades is maintained at a first angle based on control signals sent from the processor to the pitch actuator.

5. The system of claim 1, wherein the plurality of variable pitch blades comprises fan blades of an open rotor engine.

6. The system of claim 1, wherein the secondary thrust effector device comprises a fuel injection controller, an electric motor generator, inlet guide vanes, outlet guide vanes, and/or bleed valves.

7. The system of claim 1, wherein the processor is further configured to:
   detect an exit condition for the wear reduction mode, wherein the exit condition comprises a change of the target engine parameter exceeding an exit threshold; and
   in response to detecting the exit condition, switch from the wear reduction mode to the normal operating mode.

8. The system of claim 7, wherein the processor is further configured to determine an engine parameter baseline based on values of the target engine parameter over a period of time, wherein the exit condition is detected based on the change from the engine parameter baseline.

9. The system of claim 1, wherein in the wear reduction mode, the pitch of the plurality of variable pitch blades is maintained at the first angle with changes of the target engine parameter of up to 5%.

10. The system of claim 1, wherein in the wear reduction mode, the pitch of the plurality of variable pitch blades is maintained at the first angle for at least five minutes, at least ten minutes, or at least twenty minutes.

11. The system of claim 1, wherein the target engine parameter is received from an auto-throttle system and/or determined based on a pilot throttle control.

12. The system of claim 1, wherein the target engine parameter is determined based on flight conditions measured by a sensor system and a target speed.

13. The system of claim 1, wherein the trigger condition of the wear reduction mode corresponds to a cruising condition of an aircraft of the engine system.

14. The system of claim 1, wherein the target engine parameter comprises at least one of thrust, speed, torque, power, pressure, or pressure ratio parameters.

15. An engine system comprising:
a pitch actuator configured to affect a pitch of a plurality of variable pitch blades of an engine;
a secondary thrust effector device; and
a processor communicatively coupled to the pitch actuator and the secondary thrust effector device, the processor being configured to:
change the pitch of the plurality of variable pitch blades via the pitch actuator in response to changes in a target engine parameter in a normal operating mode;
detect a trigger condition for a wear reduction mode; and
in response to the trigger condition being detected, switch from the normal operating mode to the wear reduction mode, wherein in the wear reduction mode, the pitch of the plurality of variable pitch blades is maintained at a first angle, and the secondary thrust effector device is controlled in response to the changes in the target engine parameter to compensate for an effect of the pitch actuator on the target engine parameter, wherein in response to the same amount of change in the target engine parameter, the secondary thrust effector device is controlled to cause a greater effect on an output parameter of the engine in the wear reduction mode as compared to the normal operating mode.

16. An engine system comprising:
a pitch actuator configured to affect a pitch of a plurality of variable pitch blades of an engine;
a secondary thrust effector device; and
a processor communicatively coupled to the pitch actuator and the secondary thrust effector device, the processor being configured to:
change the pitch of the plurality of variable pitch blades via the pitch actuator in response to changes in a target engine parameter in a normal operating mode;
detect a trigger condition for a wear reduction mode; and
in response to the trigger condition being detected, switch from the normal operating mode to the wear reduction mode, wherein in the wear reduction mode, the pitch of the plurality of variable pitch blades is maintained at a first angle, and the secondary thrust effector device is controlled in response to the changes in the target engine parameter to compensate for an effect of the pitch actuator on the target engine parameter,
wherein the processor is further configured to:

determine, while in the wear reduction mode, target pitch angles for the plurality of variable pitch blades based on flight conditions and the target engine parameter;
switch from the wear reduction mode to an adjustment mode when an average target pitch angle in a time window deviates from the first angle for more than a threshold amount; and
change, in the adjustment mode, the angles of the plurality of variable pitch blades from the first angle to the average target pitch angle; and
in response to the plurality of variable pitch blades being pitched to the average target pitch angle, switch to the wear reduction mode.

17. An engine system comprising:
a pitch actuator configured to affect a pitch of a plurality of variable pitch blades of an engine;
a secondary thrust effector device; and
a processor communicatively coupled to the pitch actuator and the secondary thrust effector device, the processor being configured to:
change the pitch of the plurality of variable pitch blades via the pitch actuator in response to changes in a target engine parameter in a normal operating mode;
detect a trigger condition for a wear reduction mode; and
in response to the trigger condition being detected, switch from the normal operating mode to the wear reduction mode, wherein in the wear reduction mode, the pitch of the plurality of variable pitch blades is maintained at a first angle, and the secondary thrust effector device is controlled in response to the changes in the target engine parameter to compensate for an effect of the pitch actuator on the target engine parameter, wherein in the normal operating mode, the pitch actuator is in a closed command loop with the target engine parameter and the secondary thrust effector device is in an open command loop.

18. An engine system comprising:
a pitch actuator configured to affect a pitch of a plurality of variable pitch blades of an engine;
a secondary thrust effector device; and
a processor communicatively coupled to the pitch actuator and the secondary thrust effector device, the processor being configured to:
change the pitch of the plurality of variable pitch blades via the pitch actuator in response to changes in a target engine parameter in a normal operating mode;
detect a trigger condition for a wear reduction mode; and
in response to the trigger condition being detected, switch from the normal operating mode to the wear reduction mode, wherein in the wear reduction mode, the pitch of the plurality of variable pitch blades is maintained at a first angle, and the secondary thrust effector device is controlled in response to the changes in the target engine parameter to compensate for an effect of the pitch actuator on the target engine parameter, wherein in the wear reduction mode, the secondary thrust effector device is in a closed command loop with the target engine parameter and the pitch actuator is in an open command loop.

* * * * *